(12) United States Patent
Yamano

(10) Patent No.: US 8,760,770 B2
(45) Date of Patent: Jun. 24, 2014

(54) ZOOM LENS AND IMAGING APPARATUS

(75) Inventor: Hiroki Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 221 days.

(21) Appl. No.: 13/362,714

(22) Filed: Jan. 31, 2012

(65) Prior Publication Data

US 2012/0236418 A1  Sep. 20, 2012

(30) Foreign Application Priority Data

Mar. 15, 2011 (JP) ................................. 2011-057058
Mar. 15, 2011 (JP) ................................. 2011-057059

(51) Int. Cl.
*G02B 15/173* (2006.01)

(52) U.S. Cl.
CPC .................................. *G02B 15/173* (2013.01)
USPC ........................................ 359/683; 359/676

(58) Field of Classification Search
CPC .................................................... G02B 15/173
USPC .................... 359/676, 683, 684, 685
See application file for complete search history.

(56) References Cited

U.S. PATENT DOCUMENTS 7,755,844 B2 * 7/2010 Take ............................. 359/684
7,830,612 B2 * 11/2010 Hagiwara ..................... 359/676

FOREIGN PATENT DOCUMENTS

JP  2005-345968  12/2005
JP  2007-286446  11/2007

* cited by examiner

*Primary Examiner* — Zachary Wilkes
(74) *Attorney, Agent, or Firm* — Rader, Fishman & Grauer PLLC

(57) ABSTRACT

A zoom lens includes: a first lens group having positive refracting power; a second lens group having negative refracting power; a third lens group having positive refracting power; a fourth lens group having positive refracting power; and a fifth lens group having positive refracting power arranged in this order from an object side toward an image side, wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object, and the zoom lens satisfies the following conditional expression (1)

$$4.5 < 100 \times D(T,2-3)/fW < 15 \qquad (1).$$

24 Claims, 14 Drawing Sheets

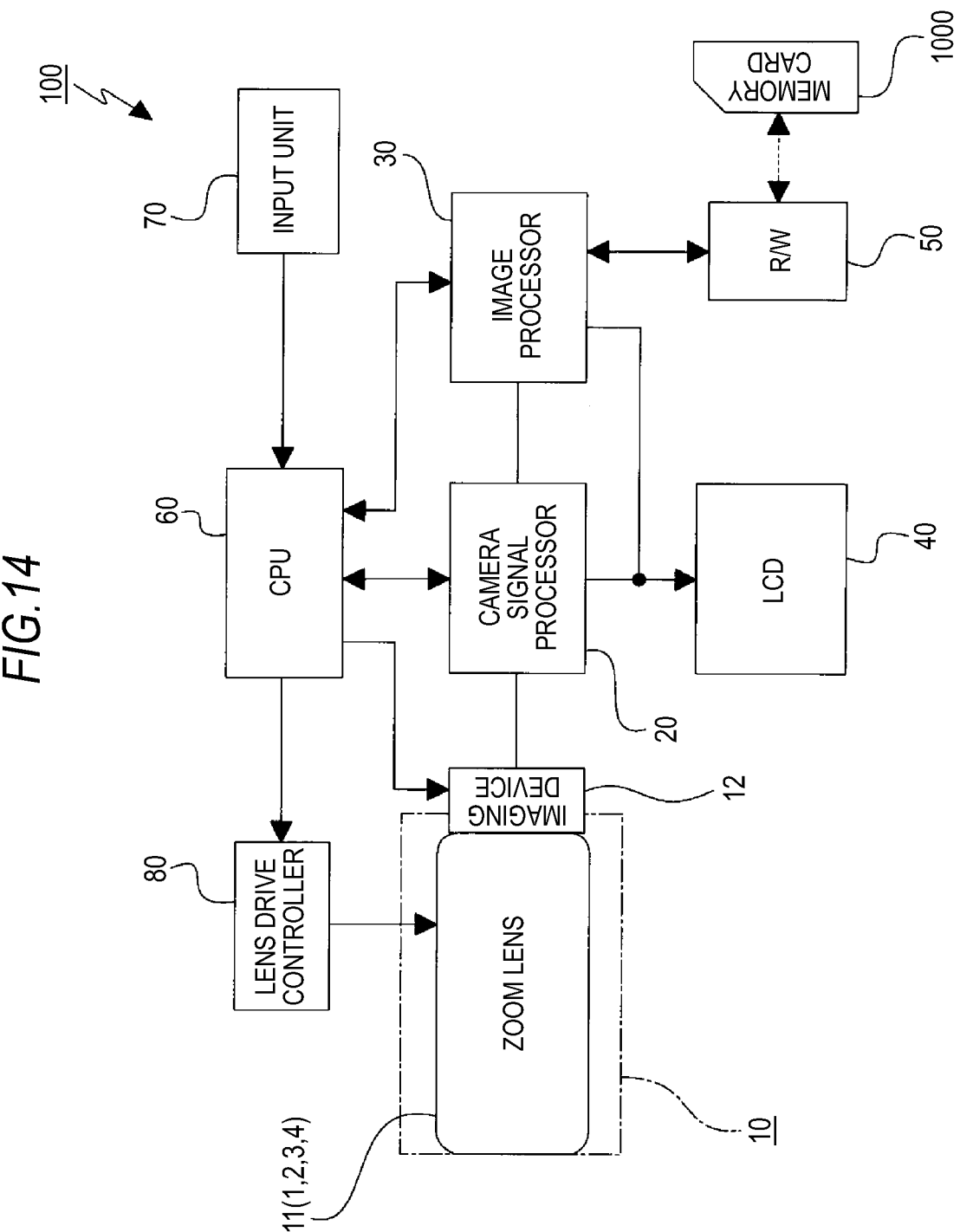

ZOOM LENS AND IMAGING APPARATUS

FIELD

The present technology relates to a zoom lens and an imaging apparatus, and particularly to a technical field of a zoom lens preferably used in a digital still camera, a video camcorder, a monitoring camera, and other cameras and having a compact size, a high zoom magnification factor, and a sufficiently wide imaging angle, and to a technical field of an imaging apparatus including the zoom lens.

BACKGROUND

In recent years, the market of digital cameras and other imaging apparatus has been growing significantly, and users has been demanding diverse features of digital cameras and other imaging apparatus. Examples of the users' demands include high image quality, compactness, thin profile, which have been typical demands, a large magnification factor, a small f-number, and a wide imaging angle of an imaging lens, which are now greatly desired.

Among a variety of zoom lenses accommodated in an imaging apparatus, what is called a positive lead-type zoom lens, in which a lens group closest to an object has positive refracting power, is typically advantageous because a large zoom magnification factor is achieved and the optical system having a small f-number across the zoom range can be designed. A positive lead-type zoom lens is therefore employed in many cases where a high magnification factor, such as a zoom magnification factor higher than 10 times, is required.

An example of such a high-magnification, positive lead-type zoom lens is a zoom lens formed of five lens groups having positive refracting power, negative, positive, positive, and positive arranged in this order from the object side to the image side (see JP-A-2007-286446 and JP-A-2005-345968, for example).

SUMMARY

In the zoom lenses described in JP-A-2007-286446 and JP-A-2005-345968, however, the magnification factor is not sufficiently large. Further, the imaging angle is not wide enough and the size is not compact enough because, to increase the imaging angle of a zoom lens of this type, it is typically necessary to increase the outer diameter of the lens closest to an object.

To increase the imaging angle or the magnification factor of an optical system, it is necessary to increase the number of lenses or the total length of the optical system because optical design needs to be so performed that aberrations are well corrected and the sensitivity to errors at the time of manufacture is reduced.

In view of the fact described above, the zoom lenses described in JP-A-2007-286446 and JP-A-2005-345968 inevitably have a large number of lenses in second and third lens groups and a long total length of the optical system resulting from an increase in travel at the time of zooming and therefore are not compact enough.

In particular, in what is called a collapsible zoom lens in which the lens is collapsed and appropriately retracted when not used (when no image is captured), it is extremely difficult to reduce the number of lenses and the length of the optical system and shorten the travel of the lenses at the time of zooming so as to reduce the total thickness of the imaging apparatus. It is therefore greatly desired to develop a zoom lens that not only provides a high magnification factor and a wide imaging angle but also achieves compactness.

An imaging apparatus using a solid-state imaging device desirably includes a zoom lens that is telecentric on the image side because the illuminance can be uniform across the image plane, and a zoom lens of this type is desirably so configured that a lens group closest to the image plane has positive refracting power.

Thus, it is desirable to provide a zoom lens and an imaging apparatus that overcome the problems described above and not only achieve compactness and satisfactory optical performance across the zooming range but also have a wide imaging angle and a high magnification factor.

An embodiment of the present technology is directed to a zoom lens including a first lens group having positive refracting power, a second lens group having negative refracting power, a third lens group having positive refracting power, a fourth lens group having positive refracting power, and a fifth lens group having positive refracting power arranged in this order from the object side toward the image side. When the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object. The zoom lens satisfies the following conditional expression (1)

$$4.5 < 100 \times D(T, 2-3)/fW < 15 \qquad (1)$$

where $D(T, 2-3)$ represents the distance along the optical axis between the surface in the second lens group that is closest to an image to be formed and the surface in the third lens group that is closest to the object to be imaged in the telescopic-end zoom position, and $fW$ represents the focal length of the entire optical system in the wide-angle-end zoom position.

In the thus configured zoom lens, magnification changing ability of the second to fourth lens groups is increased, and the distance along the optical axis between the surface in the second lens group that is closest to an image to be formed and the surface in the third lens group that is closest to an object to be imaged in the telescopic-end zoom position is optimized.

In the zoom lens described above, it is preferable that the third lens group is formed of at least two lenses and at least one air separation formed therebetween and satisfies the following conditional expression (2)

$$2.0 < d(3, \text{air})/D(T, 2-3) \qquad (2)$$

where $d(3, \text{air})$ represents the largest of the air separations in the optical axis direction present in the third lens group.

When the third lens group has at least one air separation formed between the lenses, and the zoom lens satisfies the conditional expression (2), the refracting power of each of the lenses (lens groups) on opposite sides of the air separation is optimized, and the sensitivity of the lenses to errors is lowered.

In the zoom lens described above, the third lens group is preferably formed of at least two lenses, at least one air separation formed therebetween, and a light-blocking shutter mechanism disposed in the air separation.

When the light-blocking shutter mechanism is disposed in the air separation in the third lens group, the travels over which the lens groups are moved at the time of zooming are increased.

In the zoom lens described above, the third lens group is preferably formed of at least two lenses, at least one air separation formed therebetween, a lens disposed closest to an object to be imaged and having a convex object-side surface, and an f-number determination member that determines the f-number of the light flux and is disposed in the air separation present between the vertex of the object-side surface of the lens in the third lens group that is closest to the object to be imaged and the vertex of the image-side surface of the lens in the third lens group that is closest to an image to be formed.

When the f-number determination member, which determines the f-number of the light flux, is disposed in the air separation present between the vertex of the object-side surface of the lens in the third lens group that is closest to the object to be imaged and the vertex of the image-side surface of the lens in the third lens group that is closest to the image to be formed, the travels over which the lens groups are moved at the time of zooming are increased.

The zoom lens described above preferably satisfies the following conditional expression (3)

$$5.0 < 100 \times D(T, 3-4)/fW < 20 \tag{3}$$

where D(T, 3–4) represents the distance along the optical axis between the surface in the third lens group that is closest to the image to be formed and the surface in the fourth lens group that is closest to the object to be imaged.

When the zoom lens satisfies the conditional expression (3), the distance along the optical axis between the surface in the third lens group that is closest to the image to be formed and the surface in the fourth lens group that is closest to the object to be imaged is optimized.

In the zoom lens described above, the third lens group is preferably formed of three lenses, a positive lens, a positive lens, and a negative lens arranged in this order from the object side toward the image side.

When the third lens group is formed of three lenses, a positive lens, a positive lens, and a negative lens arranged in this order from the object side toward the image side, the image-side principal position in the third lens group approaches the object to be imaged.

The zoom lens described above preferably satisfies the following conditional expression (4)

$$2.5 < f3/fW < 4.0 \tag{4}$$

where f3 represents the focal length of the third lens group.

When the zoom lens satisfies the conditional expression (4), the refracting power of the third lens group is optimized.

In the zoom lens described above, the second lens group is preferably formed of three lenses, a negative lens, a negative lens, and a positive lens arranged in this order from the object side toward the image side.

When the second lens group is formed of three lenses, a negative lens, a negative lens, and a positive lens arranged in this order from the object side toward the image side, the image-side principal position in the second lens group approaches the object to be imaged.

The zoom lens described above preferably satisfies the following conditional expression (5)

$$4.2 < [D(W, 2-4) - D(T, 2-4)]/fW < 5.6 \tag{5}$$

where D(W, 2–4) represents the distance along the optical axis between the surface in the second lens group that is closest to the object to be imaged and the surface in the fourth lens group that is closest to the image to be formed in the wide-angle-end zoom position, and D(T, 2–4) represents the distance along the optical axis between the surface in the second lens group that is closest to the object and the surface in the fourth lens group that is closest to the image in the telescopic-end zoom position.

When the zoom lens satisfies the conditional expression (5), the distance along the optical axis between the surface in the second lens group that is closest to the image to be formed and the surface in the fourth lens group that is closest to the object to be imaged is optimized.

Another embodiment of the present technology is directed to an imaging apparatus including a zoom lens and an imaging device that converts an optical image formed by the zoom lens into an electric signal. The zoom lens includes a first lens group having positive refracting power, a second lens group having negative refracting power, a third lens group having positive refracting power, a fourth lens group having positive refracting power, and a fifth lens group having positive refracting power arranged in this order from the object side toward the image side. When the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object. The zoom lens satisfies the following conditional expression (1)

$$4.5 < 100 \times D(T, 2-3)/fW < 15 \tag{1}$$

where D(T, 2–3) represents the distance along the optical axis between the surface in the second lens group that is closest to an image to be formed and the surface in the third lens group that is closest to the object to be imaged in the telescopic-end zoom position, and fW represents the focal length of the entire optical system in the wide-angle-end zoom position.

In the thus configured imaging apparatus, magnification changing ability of the second to fourth lens groups is increased, and the distance along the optical axis between the surface in the second lens group that is closest to an image to be formed and the surface in the third lens group that is closest to an object to be imaged in the telescopic-end zoom position is optimized.

The zoom lens and the imaging apparatus according to the embodiments of the present technology not only achieve compactness and satisfactory optical performance across the zooming range but also have a wide imaging angle and a high magnification factor.

BRIEF DESCRIPTION OF THE DRAWINGS

FIG. 14 is a block diagram showing an example of an imaging apparatus.

DETAILED DESCRIPTION

Figure 1:
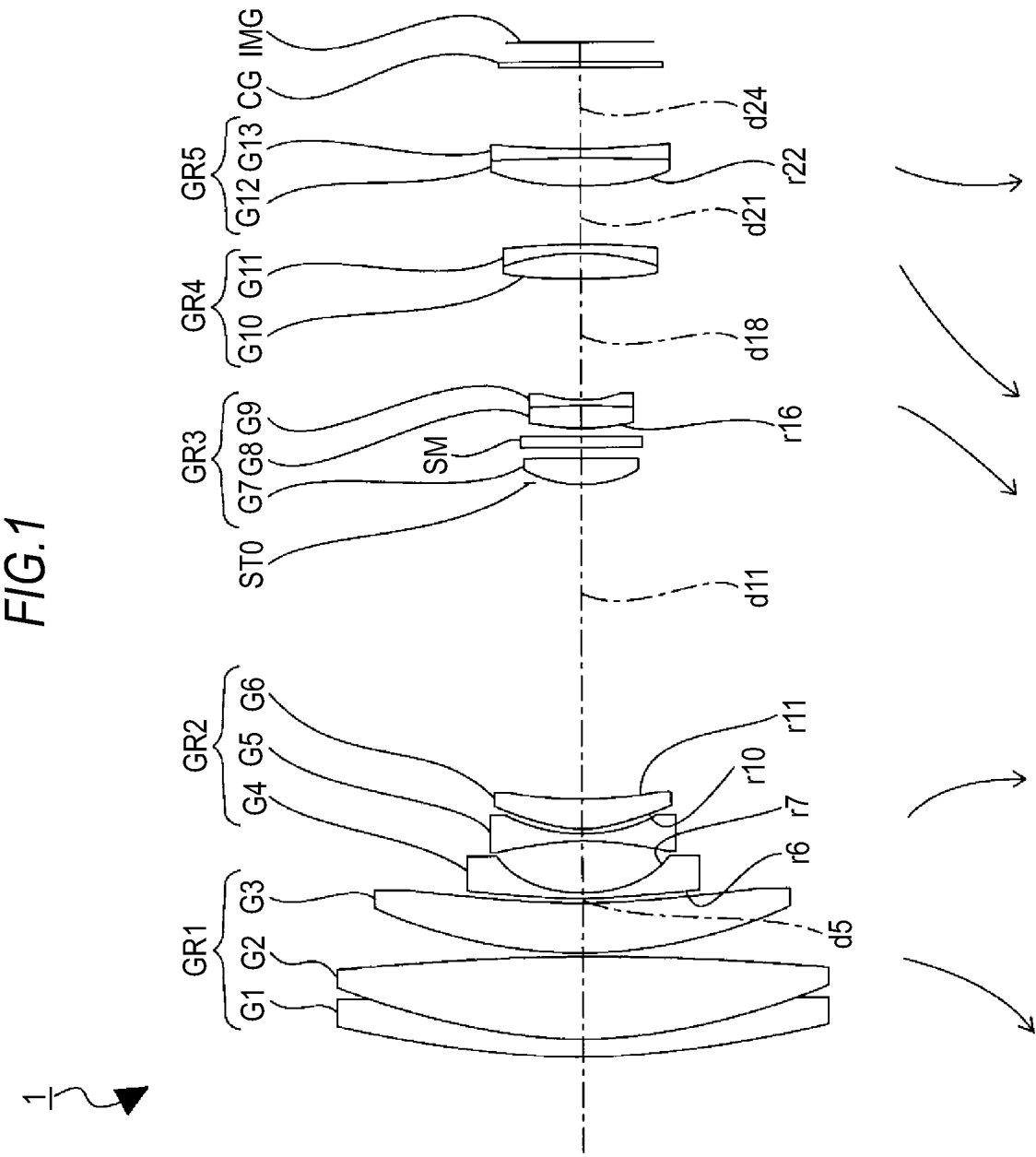
FIG. 1 shows the lens configuration of First Example of a zoom lens.

Modes for carrying out the present technology to provide a zoom lens and an imaging apparatus according thereto will be described below.

[Configuration of Zoom Lens]

A zoom lens according to an embodiment of the present technology includes a first lens group having positive refracting power, a second lens group having negative refracting power, a third lens group having positive refracting power, a fourth lens group having positive refracting power, and a fifth lens group having positive refracting power arranged in this order from the object side toward the image side.

When the zoom lens according to the embodiment of the present technology undergoes zooming operation from a wide-angle end toward a telescopic end, the first lens group moves away from the second lens group toward an object to be imaged, the third lens group approaches the second lens group toward the object, and the fourth lens group approaches the third lens group toward the object.

The configuration of the zoom lens not only maximizes magnification changing ability of the second to fourth lens groups, which greatly contribute to change in magnification of the optical system at the time of zooming, but also shortens the total length of the optical system and hence reduces the size of the zoom lens.

Further, the zoom lens according to the embodiment of the present technology satisfies the following conditional expression (1):

$$4.5 < 100 \times D(T, 2-3)/fW < 15 \quad (1)$$

where $D(T, 2-3)$ represents the distance along the optical axis between the surface in the second lens group that is closest to an image to be formed and the surface in the third lens group that is closest to an object to be imaged in the telescopic-end zoom position, and $fW$ represents the focal length of the entire optical system in the wide-angle-end zoom position.

The conditional expression (1) defines the distance between the second lens group and the third lens group in the telescopic-end zoom position.

When $100 \times D(T, 2-3)/fW$ in the conditional expression (1) is greater than the upper limit, it is difficult to increase the travels over which the second, third, and fourth lens groups are moved at the time of zooming, resulting in insufficient magnification changing ability and imaging angle and an increase in size of the optical system to achieve sufficient magnification changing ability.

On the other hand, when $100 \times D(T, 2-3)/fW$ in the conditional expression (1) is smaller than the lower limit, the adjacent lens groups approach too close each other in the telescopic-end zoom position, possibly resulting in contact between the adjacent lenses due to vibration or impact produced when the imaging apparatus is used or carried by the user.

When the zoom lens satisfies the conditional expression (1), the distance along the optical axis between the surface in the second lens group that is closest to an image to be formed and the surface in the third lens group that is closest to an object to be imaged in the telescopic-end zoom position is so optimized that sufficient magnification changing ability is ensured, whereby a wide imaging angle, a high magnification factor, and a compact size are achieved, and the adjacent lenses will not come into contact with each other.

The term $100 \times D(T, 2-3)/fW$ in the conditional expression (1) is more preferably greater than 8.5 but smaller than 10.5.

When $100 \times D(T, 2-3)/fW$ in the conditional expression (1) falls within the range described above, a more compact size, a wider imaging angle, and a higher magnification factor are achieved.

The zoom lens according to the embodiment of the present technology preferably has a third lens group formed of at least two lenses and at least one air separation formed therebetween and satisfies the following conditional expression (2):

$$2.0 < d(3, \text{air})/D(T, 2/3) \quad (2)$$

where $d(3, \text{air})$ represents the largest of the air separations in the optical axis direction present in the third lens group.

The conditional expression (2) defines the size of the air separation present in the third lens group.

When $d(3, \text{air})/D(T, 2-3)$ in the conditional expression (2) is smaller than the lower limit, the refracting power of each of the lenses (lens groups) on opposite sides of the air separation in the third lens group becomes too high, resulting in difficulty correcting spherical aberrations and coma in a satisfactory manner. Further, when $d(3, \text{air})/D(T, 2-3)$ is smaller than the lower limit, the lenses (lens groups) on opposite sides of the air separation in the third lens group become too sensitive to errors, possibly resulting in coma, chromatic aberrations, and image curvature due to eccentricity errors in the manufactured zoom lens and hence degradation in image quality.

When the zoom lens satisfies the conditional expression (2), the refracting power of each of the lenses (lens groups) on opposite sides of the air separation is so optimized that spherical aberrations and coma are well corrected, and the error sensitivity is so lowered that coma, chromatic aberrations, and curvature of field are well corrected, whereby the image quality can be improved.

The term $d(3, \text{air})/D(T, 2-3)$ in the conditional expression (2) preferably has an upper limit of 10 or is smaller than 10.

When $d(3, \text{air})/D(T, 2-3)$ in the conditional expression (2) is greater than the upper limit, the third lens group becomes too thick, resulting in a long total length of the zoom lens. In particular, in what is called a collapsible zoom lens in which the lens is collapsed and appropriately retracted when not used (when no image is captured), the retracted zoom lens may not be thin enough. When $d(3, \text{air})/D(T, 2-3)$ in the conditional expression (2) is smaller than 10, a collapsible zoom lens, in particular, can be compact.

The term $d(3, \text{air})/D(T, 2-3)$ in the conditional expression (2) is more preferably greater than 2.2 but smaller than 5.0.

When $d(3, \text{air})/D(T, 2-3)$ in the conditional expression (2) falls within the range described above, the aberrations can be corrected in a more satisfactory manner, whereby the image quality can further be improved.

The zoom lens according to the embodiment of the present technology preferably has a third lens group formed of at least two lenses, at least one air separation formed therebetween, and a light-blocking shutter mechanism disposed in the air separation.

When the shutter mechanism is disposed in the air separation in the third lens group as described above, the total length of the optical system can be reduced because the space in the zoom lens is used effectively.

The configuration readily allows the travels over which the lens groups are moved at the time of zooming to be longer than in a case where the shutter mechanism is disposed between lens groups, whereby both a high magnification factor and a compact size are achieved.

Further, when the zoom lens satisfies the conditional expression (1) described above and the shutter mechanism is disposed in the air separation in the third lens group, the distance between the second lens group and the third lens group in the telescopic-end zoom position can be reduced, and a higher magnification factor and a more compact size are achieved as described above.

The zoom lens according to the embodiment of the present technology preferably has a third lens group formed of at least two lenses, at least one air separation formed therebetween, a lens disposed closest to an object to be imaged and having a convex object-side surface, and an f-number determination member that determines the f-number of the light flux and is disposed in the air separation present between the vertex of the object-side surface of the lens in the third lens group that is closest to the object to be imaged and the vertex of the image-side surface of the lens in the third lens group that is closest to an image to be formed. The f-number determination member is, for example, an aperture stop.

When the f-number determination member is disposed in the air separation in the third lens group as described above, the total length of the optical system can be reduced because the space in the zoom lens is used effectively.

The configuration readily allows the travels over which the lens groups are moved at the time of zooming to be longer than in a case where the f-number determination member is disposed between lens groups, whereby both a high magnification factor and a compact size are achieved.

Further, in the zoom lens described above, when the conditional expression described above (1) is satisfied and the f-number determination member is disposed in the air separation in the third lens group, the distance between the second lens group and the third lens group in the telescopic-end zoom position can be reduced, whereby a higher magnification factor and a more compact size are achieved as described above.

The zoom lens according to the embodiment of the present technology preferably satisfies the following conditional expression (3)

$$5.0 < 100 \times D(T, 3\text{--}4)/fW < 20 \quad (3)$$

where D(T, 3–4) represents the distance along the optical axis between the surface in the third lens group that is closest to an image to be formed and the surface in the fourth lens group that is closest to an object to be imaged.

The conditional expression (3) defines the distance between the third lens group and the fourth lens group in the telescopic-end zoom position.

When 100×D(T, 3–4)/fW in the conditional expression (3) is greater than the upper limit, it is difficult to increase the travels over which the second, third, and fourth lens groups are moved at the time of zooming, resulting in insufficient magnification changing ability and an increase in size of the optical system to achieve sufficient magnification changing ability.

On the other hand, when 100×D(T, 3–4)/fW in the conditional expression (3) is smaller than the lower limit, the adjacent lens groups approach too close each other in the telescopic-end zoom position, possibly resulting in contact between the adjacent lenses due to vibration or impact produced when the imaging apparatus is used or carried by the user.

When the zoom lens satisfies the conditional expression (3), the distance along the optical axis between the surface in the third lens group that is closest to an image to be formed and the surface in the fourth lens group that is closest to an object to be imaged is so optimized that sufficient magnification changing ability is ensured, whereby a high magnification factor and a compact size are achieved, and the adjacent lenses will not come into contact with each other.

The zoom lens more preferably satisfies not only the conditional expression (1) described above but also the conditional expression (3). When the zoom lens satisfies the conditional expressions (1) and (3), a higher magnification factor and a more compact size are achieved.

Further, when the zoom lens satisfies the conditional expression (3) and the shutter mechanism and the f-number determination member are disposed in the air separation in the third lens group, the distance between the third lens group and the fourth lens group in the telescopic-end zoom position can be reduced, whereby a higher magnification factor and a more compact size are achieved as described above.

The term 100×D(T, 3–4)/fW in the conditional expression (3) is more preferably greater than 10.0 but smaller than 15.5.

When 100×D(T, 3–4)/fW in the conditional expression (3) falls within the range described above, a higher magnification factor and a more compact size are achieved.

The zoom lens according to the embodiment of the present technology is preferably so configured that the third lens group is formed of three lenses, a positive lens, a positive lens, and a negative lens arranged in this order from the object side toward the image side.

The configuration of the third lens group allows the image-side principal position in the third lens group to approach an object to be imaged as close as possible, whereby the third lens group can be compact particularly in the radial direction. Further, since the image-side principal position in the third lens group in the telescopic-end zoom position can approach the second lens group as close as possible, the magnification changing ability is readily improved.

In the third lens group, the positive lens and the negative lens positioned close to an image to be formed preferably form a doublet. Combining the positive lens and the negative lens into a doublet minimizes positional errors produced when the lenses are assembled at the time of manufacture. Further, combining the positive lens and the negative lens in the third lens group that are positioned close to an image to be formed into a doublet allows the shutter mechanism or the f-number determination member to be readily assembled in the third lens group.

The zoom lens according to the embodiment of the present technology preferably satisfies the following conditional expression (4)

$$2.5 < f3/fW < 4.0 \quad (4)$$

where f3 represents the focal length of the third lens group.

The conditional expression (4) defines the focal length of the third lens group.

When f3/fW in the conditional expression (4) is greater than the upper limit, the refracting power of the third lens group becomes too low, resulting in insufficient magnification changing ability and an increase in size of the optical system to achieve sufficient magnification changing ability.

On the other hand, when f3/fW in the conditional expression (4) is smaller than the lower limit, the refracting power of the third lens group becomes too high, resulting in difficulty correcting aberrations in the third lens group and hence degradation in image quality.

When the zoom lens satisfies the conditional expression (4), the refracting power of the third lens group is so optimized that sufficient magnification changing ability is ensured and the optical system becomes compact, and aberrations in the third lens group are well corrected so that the image quality is improved.

The term f3/fW in the conditional expression (4) is more preferably greater than 2.8 but smaller than 3.8.

When f3/fW in the conditional expression (4) falls within the range described above, more compactness and more improvement in image quality are achieved.

The zoom lens according to the embodiment of the present technology is preferably so configured that the second lens group is formed of three lenses, a negative lens, a negative lens, and a positive lens arranged in this order from the object side toward the image side.

The configuration of the second lens group allows the image-side principal position in the second lens group to approach an object to be imaged as close as possible with sufficient refracting power for changing magnification ensured, whereby the entrance pupil particularly in the wide-angle-end zoom position can be readily positioned close to the object, and hence the lens in the optical system that is closest to the object can be readily compact.

The zoom lens according to the embodiment of the present technology preferably satisfies the following conditional expression (5)

$$4.2 < [D(W,2-4) - D(T,2-4)]/fW < 5.6 \quad (5)$$

where D(W, 2-4) represents the distance along the optical axis between the surface in the second lens group that is closest to an object to be imaged and the surface in the fourth lens group that is closest to an image to be formed in the wide-angle-end zoom position, and D(T, 2-4) represents the distance along the optical axis between the surface in the second lens group that is closest to the object and the surface in the fourth lens group that is closest to the image in the telescopic-end zoom position.

The conditional expression (5) defines the distance between the second lens group and the fourth lens group at the time of zooming.

When [D(W, 2-4)-D(T, 2-4)]/fW in the conditional expression (5) is greater than the upper limit, it is difficult to increase the travels over which the second, third, and fourth lens groups are moved at the time of zooming, resulting in insufficient magnification changing ability and an increase in size of the optical system to achieve sufficient magnification changing ability.

On the other hand, when [D(W, 2-4)-D(T, 2-4)]/fW in the conditional expression (5) is smaller than the lower limit, the adjacent lens groups approach too close each other in the telescopic-end zoom position, possibly resulting in contact between the adjacent lenses due to vibration or impact produced when the imaging apparatus is used or carried by the user.

When the zoom lens satisfies the conditional expression (5), the distance along the optical axis between the surface in the second lens group that is closest to an image to be formed and the surface in the fourth lens group that is closest to an object to be imaged is so optimized that sufficient magnification changing ability is ensured, whereby a high magnification factor and a compact size are achieved, and the adjacent lenses will not come into contact with each other.

The zoom lens more preferably satisfies not only the conditional expression (1) described above but also the conditional expression (5). When the zoom lens satisfies the conditional expressions (1) and (5), a higher magnification factor and a more compact size are achieved.

The zoom lens still more preferably satisfies not only the conditional expressions (1) and (3) described above but also the conditional expression (5). When the zoom lens satisfies the conditional expressions (1), (3), and (5), a still higher magnification factor and a still more compact size are achieved.

Further, when the zoom lens satisfies the conditional expression (5) and the shutter mechanism and the f-number determination member are disposed in the air separation in the third lens group, the distance between the second lens group and the fourth lens group in the telescopic-end zoom position can be reduced, whereby a higher magnification factor and a more compact size are achieved as described above.

The term [D(W, 2-4)-D(T, 2-4)]/fW in the conditional expression (5) is more preferably greater than 4.5 but smaller than 5.3.

When the term [D(W, 2-4)-D(T, 2-4)]/fW in the conditional expression (5) falls within the range described above, a higher magnification factor and a more compact size are achieved.

[Second Configuration of Zoom Lens]

The zoom lens according to the embodiment of the present technology includes a first lens group having positive refracting power, a second lens group having negative refracting power, a third lens group having positive refracting power, a fourth lens group having positive refracting power, and a fifth lens group having positive refracting power arranged in this order from the object side toward the image side.

When the zoom lens according to the embodiment of the present technology undergoes zooming operation from a wide-angle end toward a telescopic end, the first lens group moves away from the second lens group toward an object to be imaged, the third lens group approaches the second lens group toward the object, and the fourth lens group approaches the third lens group toward the object.

The configuration of the zoom lens not only maximizes magnification changing ability of the second to fourth lens groups, which greatly contribute to change in magnification of the optical system at the time of zooming, but also shortens the total length of the optical system and hence reduces the size of the zoom lens.

The zoom lens according to the embodiment of the present technology satisfies the following conditional expression (6):

$$7.0 < D(W,3-4)/D(T,3-4) < 15 \quad (6)$$

where D(W,3-4) represents the inter-surface distance along the optical axis between the third lens group and the fourth lens group in the wide-angle-end zoom position, and D(T, 3-4) represents the inter-surface distance along the optical axis between the third lens group and the fourth lens group in the telescopic-end zoom position.

The conditional expression (6) defines the ratio of the distance between the third lens group and the fourth lens group in a zooming state to the distance therebetween in another zooming state or defines how much the change in the distance between the third lens group and the fourth lens group contributes to the change in the zoom magnification factor of the entire optical system.

When D(W,3-4)/D(T, 3-4) in the conditional expression (6) is greater than the upper limit, the distance between the third lens group and the fourth lens group in the wide-angleend zoom position becomes too long, resulting in an increase in total length of the optical system and an increase in size of a mechanism for moving the fourth lens group in the optical axis direction, for example, an annular cam member, and hence insufficient reduction in size of the zoom lens.

On the other hand, when D(W,3-4)/D(T, 3-4) in the conditional expression (6) is smaller than the lower limit, the combined focal length of the third lens group and the fourth lens group at the time of zooming changes too little, resulting in an insufficient wide imaging angle and magnification factor.

When the zoom lens satisfies the conditional expression (6), the distance between the third lens group and the fourth lens group in the wide-angle-end zoom position is optimized so that a compact size is achieved, and the combined focal length of the third lens group and the fourth lens group at the time of zooming changes appropriately so that a wide imaging angle and a high magnification factor are achieved.

The term D(W,3-4)/D(T, 3-4) in the conditional expression (6) is more preferably greater than 8.5 but smaller than 13.0.

When D(W,3-4)/D(T, 3-4) in the conditional expression (6) falls within the range described above, a more compact size, a wider imaging angle, and a higher magnification factor are achieved.

The zoom lens according to the embodiment of the present technology is preferably so configured that the fourth lens group includes a doublet formed of two lenses, a positive lens and a negative lens disposed in this order from the object side toward the image side.

The thus configured fourth lens group has a simple configuration, whereby the zoom lens can be compact. In particular, in what is called a collapsible zoom lens in which the lens is collapsed and appropriately retracted when not used (when no image is captured), the thus configured fourth lens group is preferable because the collapsible zoom lens can be compact.

In the zoom lens according to the embodiment of the present technology, the fourth lens group, which includes a doublet formed of two lenses, a positive lens and a negative lens, as described above, preferably works as an eccentricity correction lens group that is moved in the direction perpendicular to the optical axis.

Using the fourth lens group as the eccentricity correction lens group effectively reduces coma and chromatic aberrations resulting from eccentricity due to relative shift between the third lens group and the fourth lens group particularly in the telescopic-end zoom position, whereby the image quality can be improved.

The third lens group can alternatively work as the eccentricity correction lens group instead of the fourth lens group, which works as the eccentricity correction lens group in the above description.

The zoom lens according to the embodiment of the present technology is preferably so configured that the fourth lens group is formed of a single positive lens.

The thus configured fourth lens group has a simple configuration, whereby the zoom lens can be more compact. In particular, in what is called a collapsible zoom lens in which the lens is collapsed and appropriately retracted when not used (when no image is captured), the thus configured fourth lens group is preferable because the collapsible zoom lens can be compact.

In the zoom lens according to the embodiment of the present technology, the fourth lens group, which is formed of a single positive lens as described above, preferably works as an eccentricity correction lens group that is moved in the direction perpendicular to the optical axis.

Using the fourth lens group as the eccentricity correction lens group effectively reduces coma and chromatic aberrations resulting from eccentricity due to relative shift between the third lens group and the fourth lens group particularly in the telescopic-end zoom position, whereby the image quality can be improved.

In the zoom lens according to the embodiment of the present technology, the fourth lens group preferably satisfies the following conditional expression (7)

$$vd4>80 \qquad (7)$$

where vd4 represents the Abbe number of the material of the positive lens that forms the fourth lens group at the d line.

The conditional expression (7) defines the Abbe number of the material of the lens that forms the fourth lens group at the d line.

When vd4 in the conditional expression (7) is smaller than the lower limit, chromatic aberrations can be produced and degrade the image quality.

When the zoom lens satisfies the conditional expression (7), chromatic aberrations are well corrected, whereby the image quality is improved.

In the zoom lens according to the embodiment of the present technology, the fourth lens group that satisfies the conditional expression (7) preferably works as an eccentricity correction lens group that is moved in the direction perpendicular to the optical axis, as described above.

Using the fourth lens group as the eccentricity correction lens group effectively reduces chromatic aberrations resulting from eccentricity due to relative shift between the third lens group and the fourth lens group particularly in the telescopic-end zoom position.

The positive lens described above in the fourth lens group is preferably made of glass showing abnormal dispersion, for example, FCD1 manufactured by HOYA CORPORATION or S-FPL51 manufactured by OHARA INC. Using glass having abnormal dispersion described above as the positive lens in the fourth lens group effectively corrects chromatic aberrations.

The zoom lens according to the embodiment of the present technology preferably satisfies the following conditional expression (8):

$$5.0<f4/fW<10 \qquad (8)$$

where f4 represents the focal length of the fourth lens group, and fW represents the focal length of the entire optical system in the wide-angle-end zoom position.

The conditional expression (8) defines the focal length of the fourth lens group.

When f4/fW in the conditional expression (8) is greater than the upper limit, the refracting power of the fourth lens group becomes too low, resulting in insufficient magnification changing ability and an increase in size of the optical system to achieve sufficient magnification changing ability.

On the other hand, when f4/fW in the conditional expression (8) is smaller than the lower limit, the refracting power of the fourth lens group becomes too high, resulting in difficulty correcting aberrations in the fourth lens group and hence degradation in image quality.

When the zoom lens satisfies the conditional expression (8), the refracting power of the fourth lens group is so optimized that sufficient magnification changing ability is ensured and the optical system becomes compact, and aberrations in the fourth lens group are well corrected so that the image quality is improved.

The upper limit of the conditional expression (8) is more preferably smaller than 8.0.

When f4/fW in the conditional expression (8) falls within the range described above, a more compact size is achieved.

The zoom lens according to the embodiment of the present technology is preferably so configured that the second lens group is formed of three lenses, a negative lens, a negative lens, and a positive lens arranged in this order from the object side toward the image side.

The configuration of the second lens group allows the image-side principal position in the second lens group to approach an object to be imaged as close as possible with sufficient refracting power for changing magnification ensured, whereby the entrance pupil particularly in the wide-angle-end zoom position can be readily positioned close to the object, and hence the lens in the optical system that is closest to the object can be readily compact.

The zoom lens according to the embodiment of the present technology preferably satisfies the following conditional expression (9)

$$1.25 < |f2|/fW < 1.5 \tag{9}$$

where f2 represents the focal length of the second lens group, and fW represents the focal length of the entire optical system in the wide-angle-end zoom position.

The conditional expression (9) defines the focal length of the second lens group.

When |f2|/fW in the conditional expression (9) is greater than the upper limit, the refracting power of the second lens group becomes too low, resulting in insufficient magnification changing ability and insufficient closeness of the entrance pupil in the wide-angle-end zoom position to an object to be imaged. In this case, the diameter of the lens in the optical system that is closest to the object and hence the size of the optical system are increased.

On the other hand, when |f2|/fW in the conditional expression (9) is smaller than the lower limit, the refracting power of the second lens group becomes too high, resulting in difficulty correcting aberrations in the second lens group and hence degradation in image quality.

When the zoom lens satisfies the conditional expression (9), the refracting power of the second lens group is so optimized that sufficient magnification changing ability is ensured and the optical system becomes compact, and aberrations in the second lens group are well corrected so that the image quality is improved.

The upper limit of the conditional expression (9) is more preferably smaller than 1.4.

When |f2|/fW in the conditional expression (9) falls within the range described above, the optical system can be compact.

The zoom lens according to the embodiment of the present technology is preferably so configured that the third lens group is formed of three lenses, a positive lens, a positive lens, and a negative lens arranged in this order from the object side toward the image side.

The configuration of the third lens group allows the image-side principal position in the third lens group to approach an object to be imaged as close as possible, whereby the third lens group can be readily compact particularly in the radial direction. Further, since the image-side principal position in the third lens group in the telescopic-end zoom position can approach the second lens group as close as possible, the magnification changing ability is readily improved.

In the third lens group, the positive lens and the negative lens positioned close to an image to be formed preferably form a doublet. Combining the positive lens and the negative lens into a doublet minimizes positional errors produced when the lenses are assembled at the time of manufacture.

The zoom lens according to the embodiment of the present technology preferably satisfies the following conditional expression (10)

$$2.5 < f3/fW < 3.5 \tag{10}$$

where f3 represents the focal length of the third lens group, and fW represents the focal length of the entire optical system in the wide-angle-end zoom position.

The conditional expression (10) defines the focal length of the third lens group.

When f3/fW in the conditional expression (10) is greater than the upper limit, the refracting power of the third lens group becomes too low, resulting in insufficient magnification changing ability and an increase in size of the optical system to achieve sufficient magnification changing ability.

On the other hand, when f3/fW in the conditional expression (10) is smaller than the lower limit, the refracting power of the third lens group becomes too high, resulting in difficulty correcting aberrations in the third lens group and hence degradation in image quality.

When the zoom lens satisfies the conditional expression (10), the refracting power of the third lens group is so optimized that sufficient magnification changing ability is ensured and the optical system becomes compact, and aberrations in the third lens group are well corrected so that the image quality is improved.

The zoom lens according to the embodiment of the present technology preferably satisfies the following conditional expression (11)

$$2.5 < 100 \times (f34W/f34T)/ZWT < 3.5 \tag{11}$$

where f34W represents the combined focal length of the third lens group and the fourth lens group in the wide-angle-end zoom position, f34T represents the combined focal length of the third lens group and the fourth lens group in the telescopic-end zoom position, and ZWT represents the focal length zoom magnification factor from the wide-angle end to the telescopic end.

The conditional expression (11) defines how much the change in the combined focal length of the third lens group and the fourth lens group at the time of zooming contributes to the change in the zoom magnification factor of the entire optical system.

When 100×(f34W/f34T)/ZWT in the conditional expression (11) is greater than the upper limit, the change in the combined focal length of the third lens group and the fourth lens group contributes too much to the change in the zoom magnification factor of the entire optical system, possibly resulting in increases in travels over which the third lens group and the fourth lens group are moved. Further, in this case, since the refracting power of each of the third lens group and the fourth lens group becomes too high, aberrations therein may not be corrected appropriately. Moreover, the magnification changing ability of part of the optical system, that is, the portion on the image side of the aperture, becomes too high, and the diameter of the entrance pupil is not sufficiently magnified at the time of zooming, possibly resulting in an increase in f-number at the telescopic end.

On the other hand, when 100×(f34W/f34T)/ZWT in the conditional expression (11) is smaller than the lower limit, the change in the combined focal length of the third lens group and the fourth lens group contributes too little to the change in the zoom magnification factor of the entire optical system, resulting in insufficient magnification changing ability and an increase in size of the optical system to achieve sufficient magnification changing ability.

When the zoom lens satisfies the conditional expression (11), the change in the combined focal length of the third lens group and the fourth lens group appropriately contributes to the change in the zoom magnification factor of the entire optical system, whereby the optical system becomes compact, aberrations are well corrected, and a small f-number is ensured.

The term 100×(f34W/f34T)/ZWT in the conditional expression (11) is more preferably greater than 6.0 but smaller than 7.0.

When 100×(f34W/f34T)/ZWT in the conditional expression (11) falls within the range described above, the optical system becomes more compact, aberrations are corrected in a more satisfactory manner, and a smaller f-number is ensured.

[Numerical Examples for Zoom Lens]

Specific examples of the zoom lenses according to the embodiments of the present technology and numerical examples in which specific values are used in the specific examples will be described below with reference to the drawings and tables.

The meanings and other information of the symbols shown in the following tables and descriptions are as follows.

Reference character "si" denotes a surface number of an i-th surface counted from the object side toward the image side. Reference character "ri" denotes the paraxial radius of curvature of an i-th surface. Reference character "di" denotes an on-axis inter-surface distance (central thickness of lens or air separation) between an i-th surface and an (i+1)-th surface. Reference character "ni" denotes the refractive index of a lens or any other optical component starting with an i-th surface at the d line (λ=587.6 nm). Reference character "vi" denotes the Abbe number of a lens or any other optical component starting with an i-th surface at the d line.

In the field of "si", "ASP" indicates that the surface is an aspheric surface, and in the field of "ri", "INFINITY" indicates that the surface is a flat surface.

Reference character "f" denotes a focal length. Reference character "Fno" denotes an f-number. Reference character "ω" denotes a half imaging angle.

Reference character "K" denotes a conic constant, and reference characters "A", "B", "C", and "D" denote fourth, sixth, eighth, and tenth aspheric coefficients, respectively.

In each of the followings tables showing the aspheric coefficients, "E-n" represents exponential notation using a base of 10, that is, "$10^{-n}$." For example, "0.12345E−05" represents "$0.12345 \times 10^{-5}$."

Some zoom lenses used in Examples have an aspheric lens surface. The shape of an aspheric surface is defined by the following expression:

$$x = \frac{cy^2}{1 + \{1-(1+\kappa)c^2 y^2\}^{1/2}} + Ay^4 + By^6 + \ldots$$

where reference character "x" denotes the distance from the vertex of the lens surface in the optical axis direction (the amount of sag), reference character "y" denotes the height in the direction perpendicular to the optical axis direction (image height), reference character "c" denotes the paraxial curvature at the vertex of the lens (reciprocal of radius of curvature), reference character "K" denotes the conic constant, and reference characters "A", "B", "C", and "D" denote fourth, sixth, eighth, and tenth aspheric coefficients, respectively.

FIGS. 1, 4, 7, and 10 show the lens configurations of zoom lenses 1 to 4 in First to Forth Examples of the present technology.

In each of the figures, the arrows indicate the directions in which the lens groups are moved during zooming operation.

First Example

FIG. 1 shows the lens configuration of the zoom lens 1 in First Example of the present technology.

The zoom lens 1 includes a first lens group GR1 having positive refracting power, a second lens group GR2 having negative refracting power, a third lens group GR3 having positive refracting power, a fourth lens group GR4 having positive refracting power, and a fifth lens group GR5 having positive refracting power arranged in this order from the object side toward the image side.

The zoom lens 1 has a zoom magnification factor set at 17.9.

The first lens group GR1 is formed of a doublet obtained by bonding a negative meniscus lens G1 with a convex surface on the object side to a positive biconvex lens G2, and a positive meniscus lens G3 with a convex surface on the object side arranged in this order from the object side toward the image side.

The second lens group GR2 is formed of a negative meniscus lens G4 with a convex surface on the object side, a negative biconcave lens G5, and a positive meniscus lens G6 with a convex surface on the object side arranged in this order from the object side toward the image side.

The third lens group GR3 is formed of a positive biconvex lens G7 and a doublet obtained by bonding a positive biconvex lens G8 positioned on the object side to a negative biconcave lens G9 positioned on the image side arranged in this order from the object side toward the image side.

An air separation is formed between the positive lens G7 and the positive lens G8 in the third lens group GR3, and a shutter mechanism SM is disposed in the air separation.

The fourth lens group GR4 is formed of a doublet obtained by bonding a positive biconvex lens G10 positioned on the object side to a negative meniscus lens G11 positioned on the image side and having a concave surface on the object side.

The fifth lens group GR5 is formed of a doublet obtained by bonding a positive biconvex lens G12 positioned on the object side to a negative biconcave lens G13 positioned on the image side.

A cover glass plate CG is disposed between the fifth lens group GR5 and an image plane IMG. An infrared cutoff filter or a variety of other filters may be disposed between the image plane IMG and the cover glass plate CG, or the cover glass plate CG can alternatively be configured to have the same function as that of the infrared cutoff filter or any other filter.

An aperture stop STO, which functions as an f-number determination member that determines the f-number of the light flux, is disposed in the vicinity and on the object side of the third lens group GR3 and moved integrally therewith. Part of the positive lens G7 is inserted into the opening of the aperture stop STO from the image side.

Table 1 shows lens data in Numerical Example 1 in which specific values are used in the zoom lens 1 in First Example.

TABLE 1

| si | ri | di | ni | vi |
|---|---|---|---|---|
| 1 | 57.839 | 1.000 | 1.84666 | 23.780 |
| 2 | 33.060 | 4.630 | 1.49700 | 81.608 |
| 3 | −142.539 | 0.150 | | |
| 4 | 27.031 | 2.720 | 1.72916 | 54.674 |

TABLE 1-continued

| si | ri | di | ni | vi |
|---|---|---|---|---|
| 5 | 60.770 | (d 5) | | |
| 6 (ASP) | 80.266 | 0.300 | 1.82080 | 42.706 |
| 7 (ASP) | 6.525 | 2.824 | | |
| 8 | −20.632 | 0.450 | 1.75500 | 52.321 |
| 9 | 9.135 | 0.250 | | |
| 10 (ASP) | 7.116 | 1.740 | 2.00170 | 19.324 |
| 11 (ASP) | 16.800 | (d 11) | | |

TABLE 1-continued

| si | ri | di | ni | vi |
|---|---|---|---|---|
| 12 | INFINITY | 0.500 | | |
| STO | INFINITY | −0.500 | | |
| 14 | 6.302 | 1.467 | 1.49700 | 81.608 |
| 15 | −106.451 | 1.650 | | |
| 16 (ASP) | 11.208 | 1.200 | 1.74330 | 49.326 |
| 17 | −40.604 | 0.400 | 1.80610 | 33.269 |
| 18 | 7.642 | (d 18) | | |
| 19 | 25.797 | 1.433 | 1.72000 | 43.690 |
| 20 | −13.800 | 0.350 | 1.84666 | 23.778 |
| 21 | −39.659 | (d 21) | | |
| 22 (ASP) | 14.660 | 1.595 | 1.69350 | 53.201 |
| 23 | −63.308 | 0.400 | 1.74950 | 35.041 |
| 24 | 40.000 | (d 24) | | |
| 25 | INFINITY | 0.300 | 1.51680 | 64.200 |
| 26 | INFINITY | 1.000 | | |
| IMG | INFINITY | | | |

When the magnification of the zoom lens 1 is changed between a wide-angle-end state and a telescopic-end state, the following inter-surface distances change: the inter-surface distance d5 between the first lens group GR1 and the second lens group GR2, the inter-surface distance d11 between the second lens group GR2 and the third lens group GR3, the inter-surface distance d18 between the third lens group GR3 and the fourth lens group GR4, the inter-surface distance d21 between the fourth lens group GR4 and the fifth lens group GR5, and the inter-surface distance d24 between the fifth lens group GR5 and the cover glass plate CG.

Table 2 shows the variable inter-surface distances in the wide-angle-end state, an intermediate-focal-length state, and the telescopic-end state along with the f-numbers Fno and the half imaging angles ω in Numerical Example 1.

TABLE 2

| F | 4.78 | 15.91 | 85.60 |
|---|---|---|---|
| Fno | 3.24 | 4.17 | 5.77 |
| ω | 40.64 | 13.51 | 2.56 |
| d 5 | 0.350 | 13.712 | 27.775 |
| d 11 | 17.650 | 6.952 | 0.450 |
| d 18 | 6.800 | 3.048 | 0.700 |
| d 21 | 3.391 | 10.626 | 23.196 |
| d 24 | 4.720 | 7.745 | 5.016 |

In the zoom lens 1, the following surfaces are aspheric surfaces: both surfaces (sixth and seventh surfaces) of the negative lens G4 in the second lens group GR2, both surfaces (tenth and eleventh surfaces) of the positive lens G6 in the second lens group GR2, the object-side surface (sixteenth surface) of the positive lens G8 in the third lens group GR3, and the object-side surface (twenty second surface) of the positive lens G12 in the fifth lens group GR5. Table 3 shows the fourth, sixth, eighth, and tenth aspheric coefficients A, B, C, D and the conic constants K of the aspheric surfaces in Numerical Example 1.

TABLE 3

| si | K | A | B | C | D |
|---|---|---|---|---|---|
| 6 | 0.00000E+00 | 3.39144E−04 | −4.75395E−06 | −9.09618E−08 | 1.45120E−09 |
| 7 | 0.00000E+00 | −1.80011E−04 | 1.40828E−05 | 1.43241E−07 | −1.38184E−08 |
| 10 | −2.33597E+00 | −6.75670E−04 | 2.81089E−05 | −5.23368E−07 | 0.00000E+00 |
| 11 | 0.00000E+00 | −9.62886E−04 | 2.52024E−05 | −8.81277E−07 | 9.10039E−09 |
| 16 | 0.00000E+00 | −6.18040E−04 | −8.14747E−06 | −1.03010E−06 | 0.00000E+00 |
| 22 | 0.00000E+00 | −4.40212E−05 | 3.15897E−06 | −1.19731E−07 | 2.15770E−09 |

Figure 2:
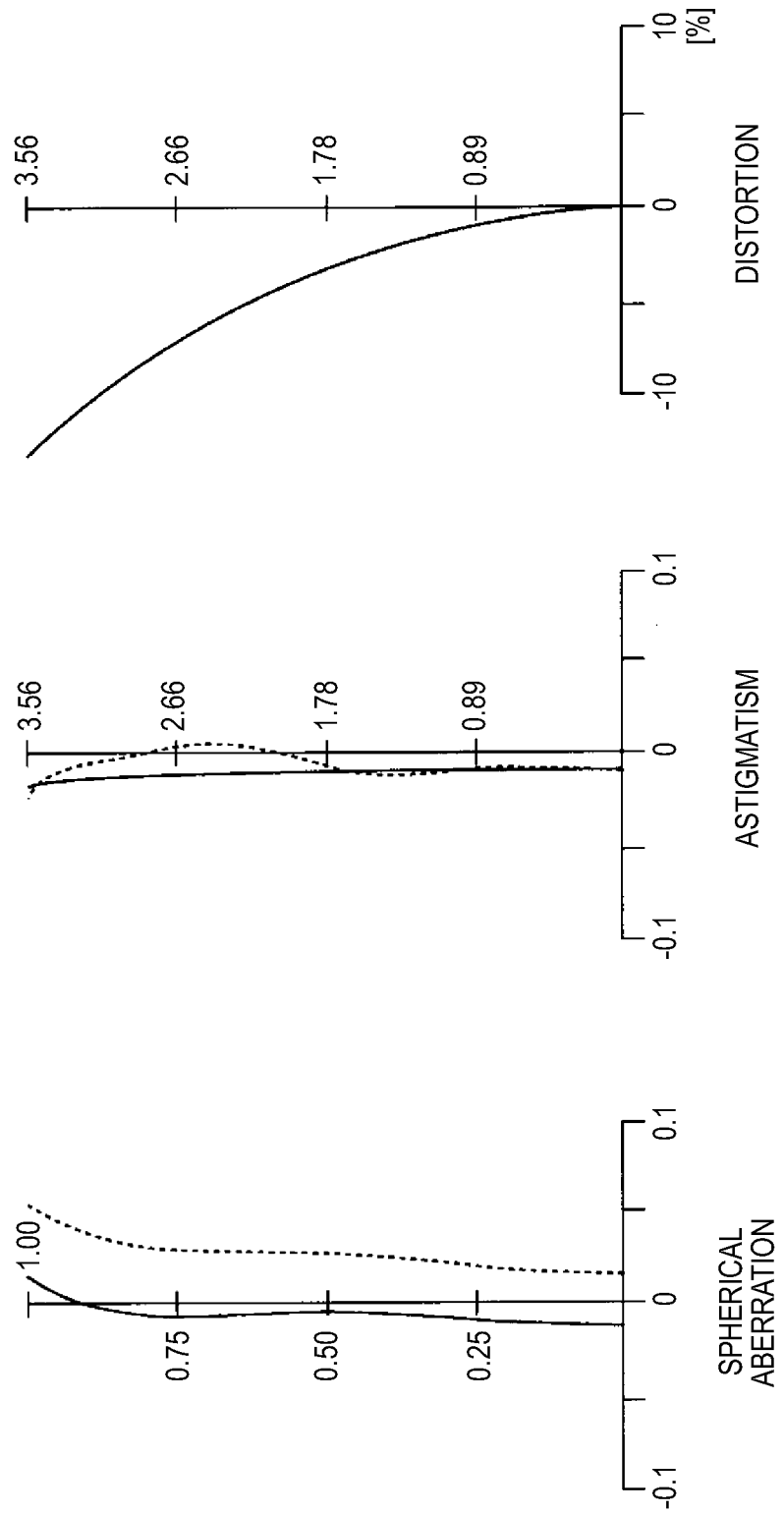
FIG. 2, along with FIG. 3, is aberration diagrams in a numerical example in which specific values are used in First Example and shows spherical aberration, astigmatism, and distortion in a wide-angle-end state.
Figure 3:
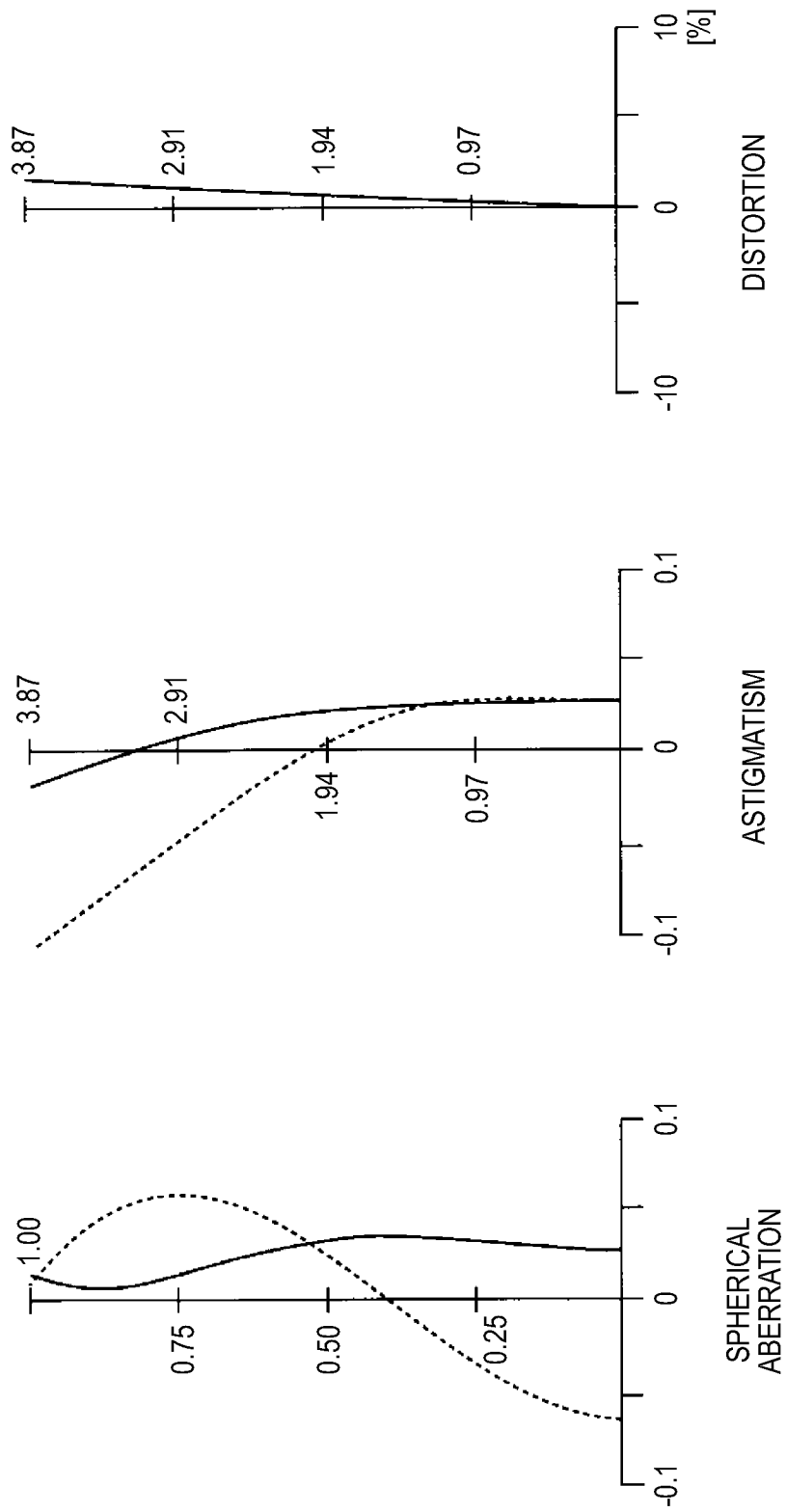
FIG. 3 shows spherical aberration, astigmatism, and distortion in a telescopic-end state.

FIGS. 2 and 3 are aberration diagrams in a state in which an infinite point is brought into focus in Numerical Example 1. FIG. 2 is aberration diagrams in the wide-angle-end state, and FIG. 3 is aberration diagrams in the telescopic-end state.

In the spherical aberration diagrams in FIGS. 2 and 3, the solid lines represent spherical aberration values at the d line (wavelength of 587.6 nm) and the broken lines represent spherical aberration values at the g line (wavelength of 435.8 nm). In the astigmatism diagrams in FIGS. 2 and 3, the solid lines represent astigmatism values in the sagittal image plane and the broken lines represent astigmatism values in the meridional image plane.

The aberration diagrams clearly show that the aberrations have been well corrected and excellent imaging performance has been achieved in Numerical Example 1.

Second Example

Figure 4:
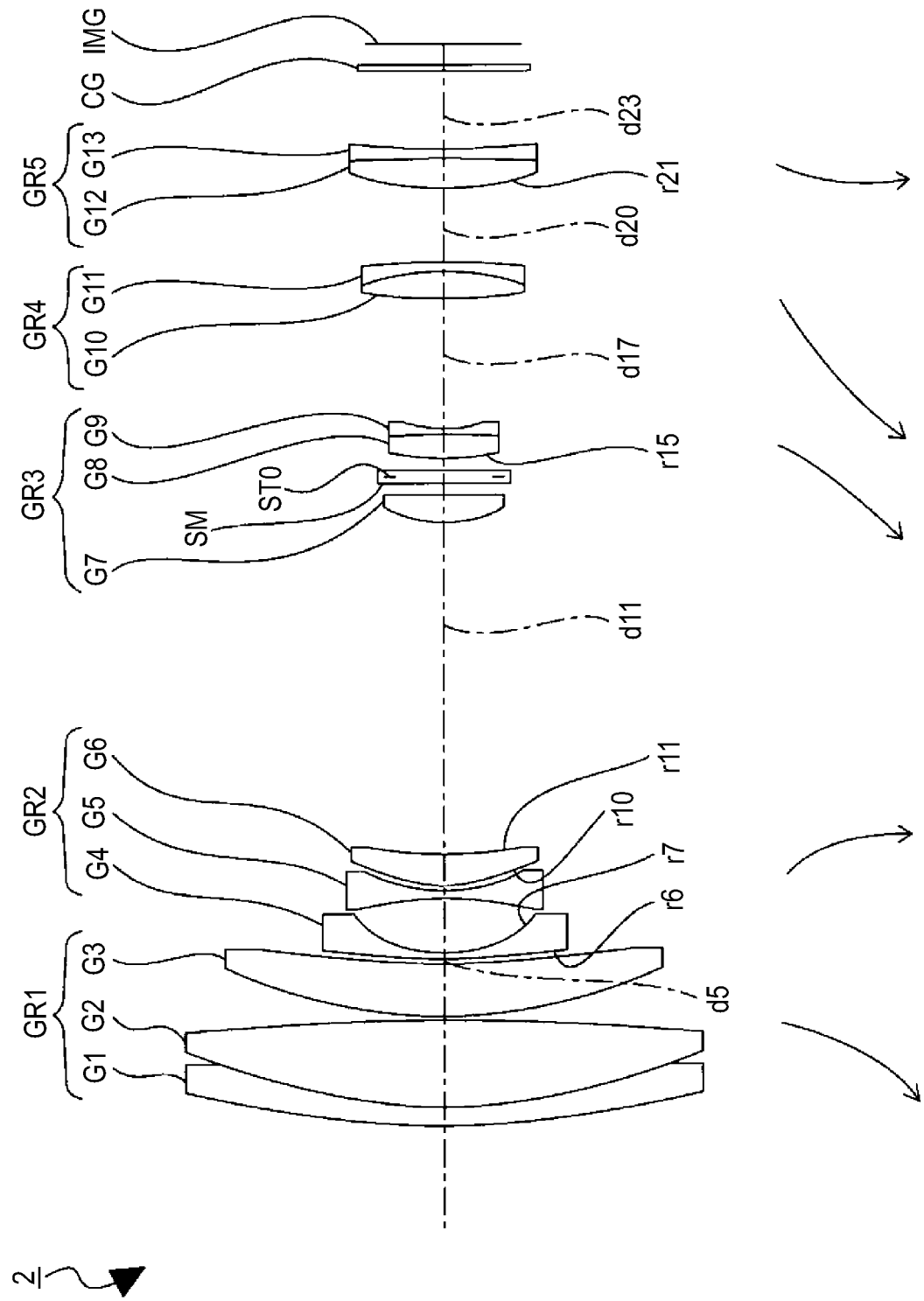
FIG. 4 shows the lens configuration of Second Example of the zoom lens.

FIG. 4 shows the lens configuration of a zoom lens 2 in Second Example of the present technology.

The zoom lens 2 includes a first lens group GR1 having positive refracting power, a second lens group GR2 having negative refracting power, a third lens group GR3 having positive refracting power, a fourth lens group GR4 having positive refracting power, and a fifth lens group GR5 having positive refracting power arranged in this order from the object side toward the image side.

The zoom lens 2 has a zoom magnification factor set at 17.9.

The first lens group GR1 is formed of a doublet obtained by bonding a negative meniscus lens G1 with a convex surface on the object side to a positive biconvex lens G2, and a positive meniscus lens G3 with a convex surface on the object side arranged in this order from the object side toward the image side.

The second lens group GR2 is formed of a negative meniscus lens G4 with a convex surface on the object side, a negative biconcave lens G5, and a positive meniscus lens G6 with a convex surface on the object side arranged in this order from the object side toward the image side.

The third lens group GR3 is formed of a positive biconvex lens G7 and a doublet obtained by bonding a positive biconvex lens G8 positioned on the object side to a negative biconcave lens G9 positioned on the image side arranged in this order from the object side toward the image side.

An air separation is formed between the positive lens G7 and the positive lens G8 in the third lens group GR3, and a shutter mechanism SM is disposed in the air separation.

The fourth lens group GR4 is formed of a doublet obtained by bonding a positive biconvex lens G10 positioned on the object side to a negative meniscus lens G11 positioned on the image side and having a concave surface on the object side.

The fifth lens group GR5 is formed of a doublet obtained by bonding a positive biconvex lens G12 positioned on the object side to a negative biconcave lens G13 positioned on the image side.

A cover glass plate CG is disposed between the fifth lens group GR5 and an image plane IMG. An infrared cutoff filter or a variety of other filters may be disposed between the image plane IMG and the cover glass plate CG, or the cover glass plate CG can alternatively be configured to have the same function as that of the infrared cutoff filter or any other filter.

An aperture stop STO, which functions as an f-number determination member that determines the f-number of the light flux, is disposed between the positive lens G7 and the positive lens G8 in the third lens group GR3 and moved integrally therewith. The aperture stop STO is integrated with the shutter mechanism SM, and part of the shutter mechanism SM works as the aperture stop STO.

Table 4 shows lens data in Numerical Example 2 in which specific values are used in the zoom lens 2 in Second Example.

TABLE 4

| si | ri | di | ni | vi |
|---|---|---|---|---|
| 1 | 55.361 | 0.900 | 1.84666 | 23.780 |
| 2 | 31.874 | 4.620 | 1.49700 | 81.608 |
| 3 | −153.898 | 0.150 | | |
| 4 | 26.765 | 2.785 | 1.72916 | 54.674 |
| 5 | 63.037 | (d 5) | | |
| 6 (ASP) | 128.554 | 0.300 | 1.80139 | 45.450 |
| 7 (ASP) | 6.490 | 2.916 | | |
| 8 | −17.500 | 0.450 | 1.75500 | 52.323 |
| 9 | 9.096 | 0.250 | | |
| 10 (ASP) | 7.000 | 1.841 | 1.92286 | 20.880 |
| 11 (ASP) | 21.077 | (d 11) | | |
| 12 | 6.398 | 1.461 | 1.49700 | 81.608 |
| 13 | −62.405 | 0.825 | | |
| STO | INFINITY | 0.825 | | |
| 15 (ASP) | 12.951 | 1.200 | 1.76802 | 49.241 |
| 16 | −42.137 | 0.400 | 1.80610 | 33.269 |
| 17 | 8.000 | (d 17) | | |
| 18 | 24.656 | 1.350 | 1.61800 | 63.390 |
| 19 | −16.655 | 0.350 | 1.68893 | 31.161 |
| 20 | −41.958 | (d 20) | | |

TABLE 4-continued

| si | ri | di | ni | vi |
|---|---|---|---|---|
| 21 (ASP) | 14.660 | 1.627 | 1.74330 | 49.326 |
| 22 | −160.000 | 0.400 | 1.84666 | 23.780 |
| 23 | 42.012 | (d 23) | | |
| 24 | INFINITY | 0.300 | 1.51680 | 64.200 |
| 25 | INFINITY | 1.000 | | |
| IMG | INFINITY | | | |

When the magnification of the zoom lens 2 is changed between the wide-angle-end state and the telescopic-end state, the following inter-surface distances change: the inter-surface distance d5 between the first lens group GR1 and the second lens group GR2, the inter-surface distance d11 between the second lens group GR2 and the third lens group GR3, the inter-surface distance d17 between the third lens group GR3 and the fourth lens group GR4, the inter-surface distance d20 between the fourth lens group GR4 and the fifth lens group GR5, and the inter-surface distance d23 between the fifth lens group GR5 and the cover glass plate CG.

Table 5 shows the variable inter-surface distances in the wide-angle end-state, the intermediate-focal-length state, and the telescopic-end state along with the f-numbers Fno and the half imaging angles ω in Numerical Example 2.

TABLE 5

| f | 4.78 | 16.01 | 85.60 |
|---|---|---|---|
| Fno | 3.30 | 4.17 | 5.74 |
| ω | 40.55 | 13.41 | 2.56 |
| d 5 | 0.350 | 13.533 | 26.958 |
| d 11 | 18.230 | 7.030 | 0.450 |
| d 17 | 7.200 | 3.085 | 0.700 |
| d 20 | 4.208 | 11.315 | 23.895 |
| d 23 | 4.184 | 7.750 | 4.997 |

In the zoom lens 2, the following surfaces are aspheric surfaces: both surfaces (sixth and seventh surfaces) of the negative lens G4 in the second lens group GR2, both surfaces (tenth and eleventh surfaces) of the positive lens G6 in the second lens group GR2, the object-side surface (fifteenth surface) of the positive lens G8 in the third lens group GR3, and the object-side surface (twenty first surface) of the positive lens G12 in the fifth lens group GR5. Table 6 shows the fourth, sixth, eighth, and tenth aspheric coefficients A, B, C, D and the conic constants K of the aspheric surfaces in Numerical Example 2.

TABLE 6

| si | K | A | B | C | D |
|---|---|---|---|---|---|
| 6 | 0.00000E+00 | 2.94783E−04 | −9.60130E−08 | −1.47436E−07 | 1.56181E−09 |
| 7 | 0.00000E+00 | −2.68801E−04 | 1.71359E−05 | 1.13507E−07 | −7.16649E−09 |
| 10 | −2.57276E+00 | −4.27160E−04 | 2.41367E−05 | −6.28570E−07 | 0.00000E+00 |
| 11 | 0.00000E+00 | −7.03057E−04 | 2.24884E−05 | −1.06302E−06 | 1.13224E−08 |
| 15 | 0.00000E+00 | −5.94875E−04 | −9.46913E−06 | −7.72064E−07 | 0.00000E+00 |
| 21 | 0.00000E+00 | −3.19776E−05 | 1.58179E−06 | −3.70953E−08 | 4.94926E−10 |

Figure 5:
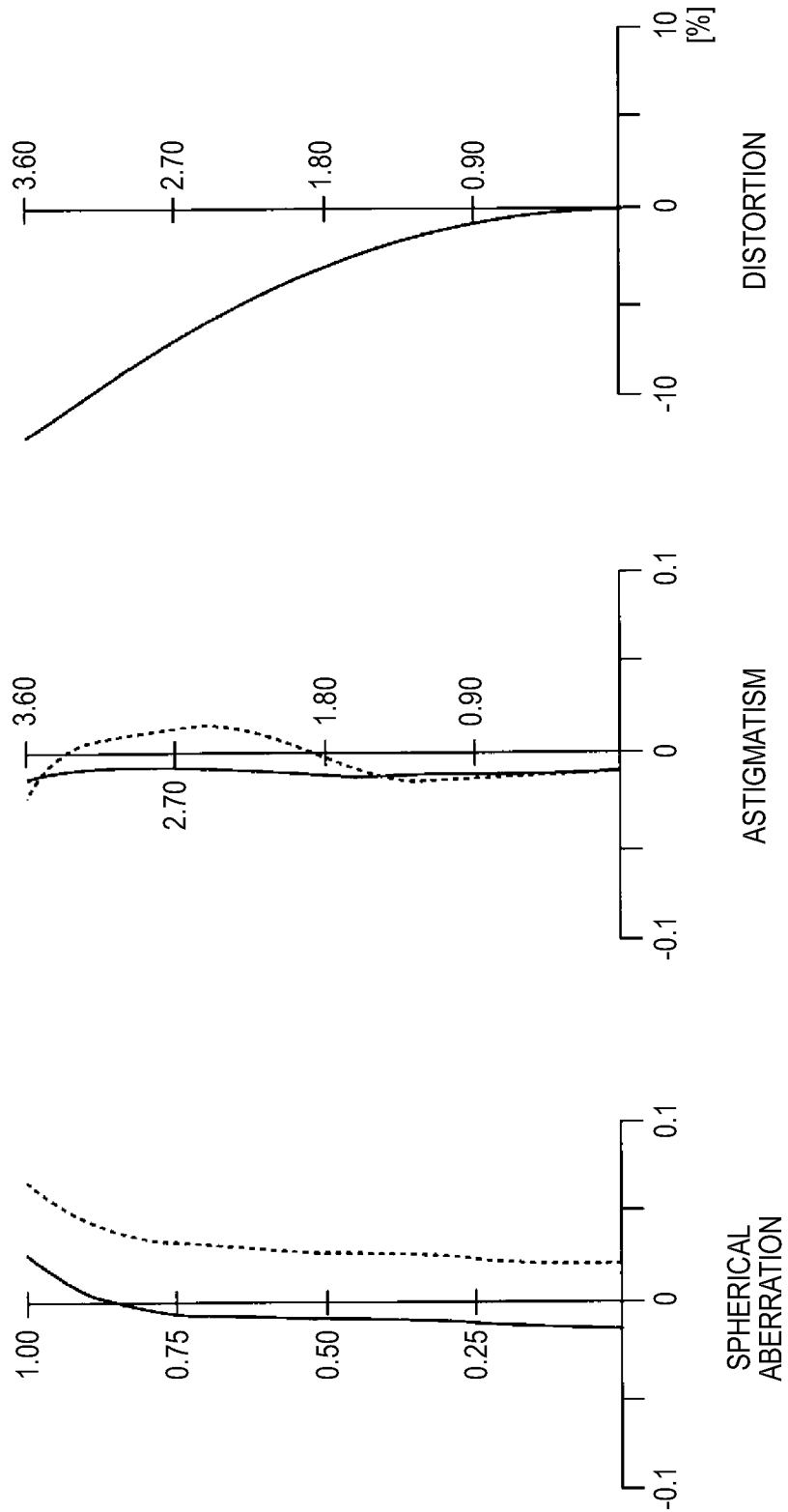
FIG. 5, along with FIG. 6, is aberration diagrams in a numerical example in which specific values are used into Second Example and shows spherical aberration, astigmatism, and distortion in the wide-angle-end state.
Figure 6:
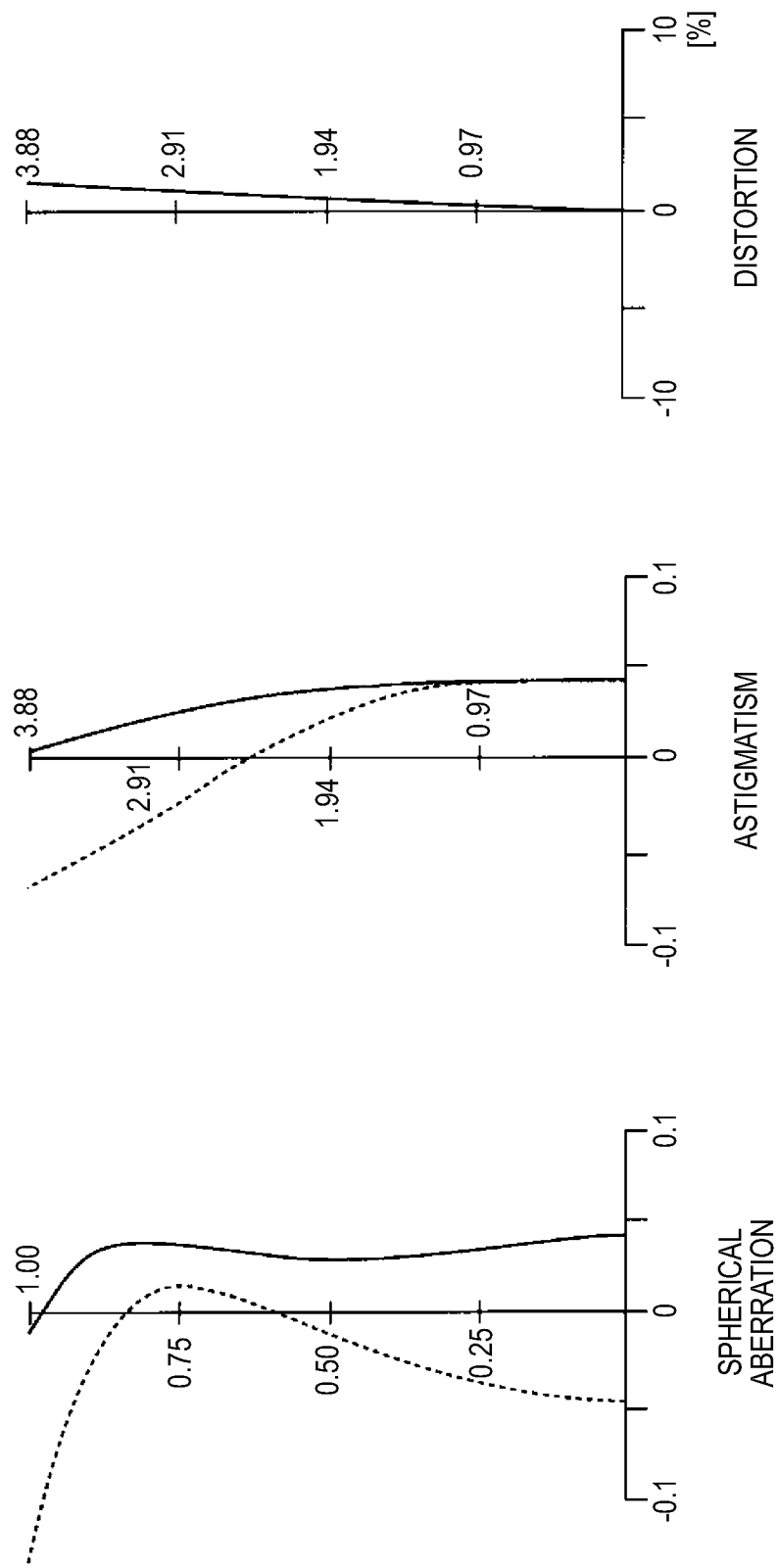
FIG. 6 shows spherical aberration, astigmatism, and distortion in the telescopic-end state.

FIGS. 5 and 6 are aberration diagrams in a state in which an infinite point is brought into focus in Numerical Example 2. FIG. 5 is aberration diagrams in the wide-angle-end state, and FIG. 6 is aberration diagrams in the telescopic-end state.

In the spherical aberration diagrams in FIGS. 5 and 6, the solid lines represent spherical aberration values at the d line (wavelength of 587.6 nm) and the broken lines represent spherical aberration values at the g line (wavelength of 435.8 nm). In the astigmatism diagrams in FIGS. 5 and 6, the solid lines represent astigmatism values in the sagittal image plane, and the broken lines represent astigmatism values in the meridional image plane.

The aberration diagrams clearly show that the aberrations have been well corrected and excellent imaging performance has been achieved in Numerical Example 2.

Third Example

Figure 7:
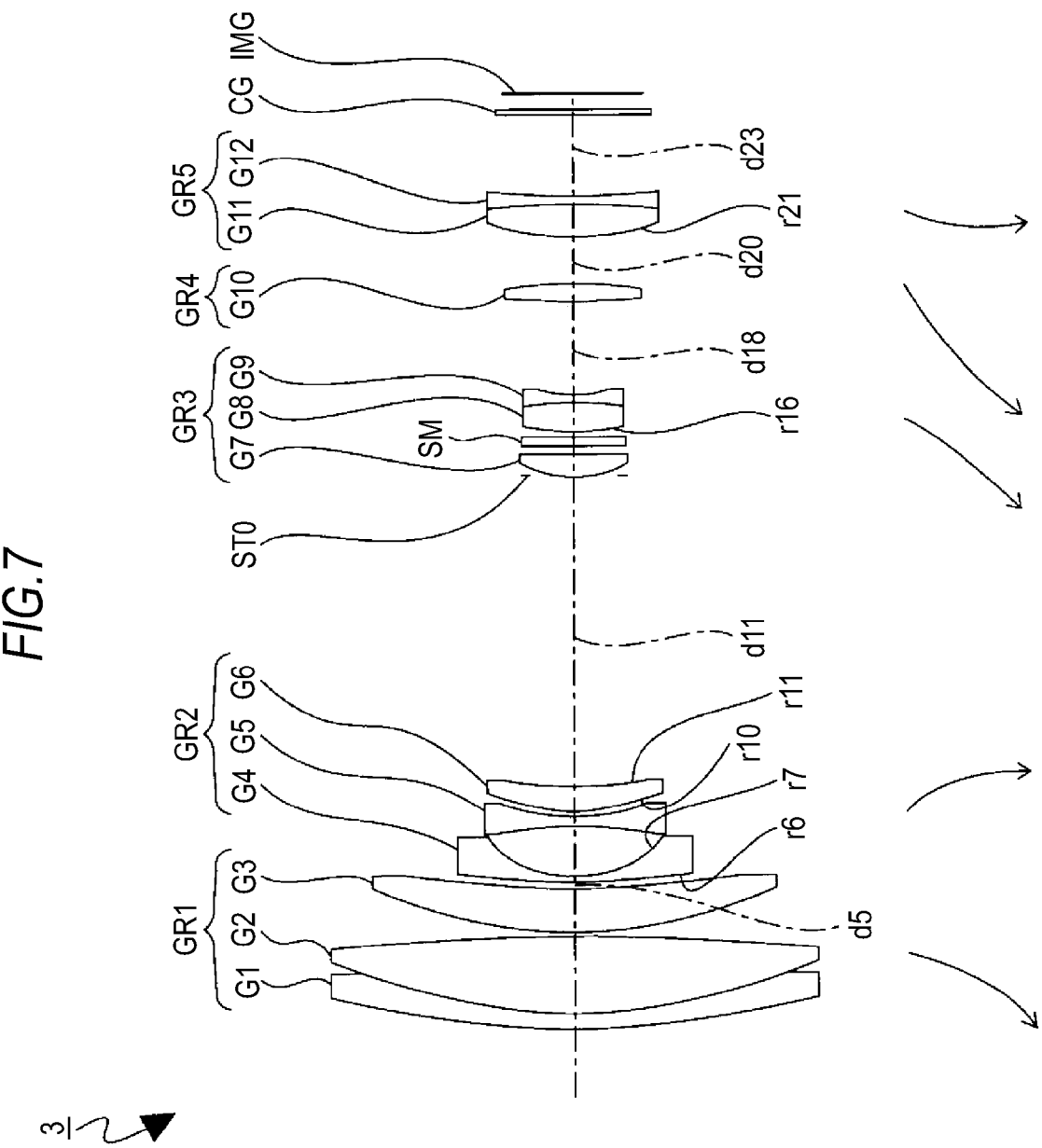
FIG. 7 shows the lens configuration of Third Example of the zoom lens.

FIG. 7 shows the lens configuration of a zoom lens 3 in Third Example of the present technology.

The zoom lens 3 includes a first lens group GR1 having positive refracting power, a second lens group GR2 having negative refracting power, a third lens group GR3 having positive refracting power, a fourth lens group GR4 having positive refracting power, and a fifth lens group GR5 having positive refracting power arranged in this order from the object side toward the image side.

The zoom lens 3 has a zoom magnification factor set at 17.8.

The first lens group GR1 is formed of a doublet obtained by bonding a negative meniscus lens G1 with a convex surface on the object side to a positive biconvex lens G2, and a positive meniscus lens G3 with a convex surface on the object side arranged in this order from the object side toward the image side.

The second lens group GR2 is formed of a negative meniscus lens G4 with a convex surface on the object side, a negative biconcave lens G5, and a positive meniscus lens G6 with a convex surface on the object side arranged in this order from the object side toward the image side.

The third lens group GR3 is formed of a positive biconvex lens G7 and a doublet obtained by bonding a positive biconvex lens G8 positioned on the object side to a negative biconcave lens G9 positioned on the image side arranged in this order from the object side toward the image side.

An air separation is formed between the positive lens G7 and the positive lens G8 in the third lens group GR3, and a shutter mechanism SM is disposed in the air separation.

The fourth lens group GR4 is formed of a positive biconvex lens G10.

The fifth lens group GR5 is formed of a doublet obtained by bonding a positive biconvex lens G11 positioned on the object side to a negative biconcave lens G12 positioned on the image side.

A cover glass plate CG is disposed between the fifth lens group GR5 and an image plane IMG. An infrared cutoff filter or a variety of other filters may be disposed between the image plane IMG and the cover glass plate CG, or the cover glass plate CG can alternatively be configured to have the same function as that of the infrared cutoff filter or any other filter.

An aperture stop STO, which functions as an f-number determination member that determines the f-number of the light flux, is disposed in the vicinity and on the object side of the third lens group GR3 and moved integrally therewith. Part of the positive lens G7 is inserted into the opening of the aperture stop STO from the image side.

Table 7 shows lens data in Numerical Example 3 in which specific values are used in the zoom lens 3 in Third Example.

TABLE 7

| si | ri | di | ni | vi |
|---|---|---|---|---|
| 1 | 56.343 | 0.900 | 1.84666 | 23.780 |
| 2 | 32.650 | 4.669 | 1.49700 | 81.608 |
| 3 | −128.654 | 0.150 | | |
| 4 | 25.788 | 2.678 | 1.72916 | 54.674 |
| 5 | 53.848 | (d 5) | | |
| 6 (ASP) | 26.879 | 0.300 | 1.85135 | 40.105 |
| 7 (ASP) | 5.762 | 3.078 | | |
| 8 | −23.746 | 0.450 | 1.77250 | 49.624 |
| 9 | 11.240 | 0.250 | | |
| 10 (ASP) | 8.739 | 1.769 | 1.94595 | 17.980 |
| 11 (ASP) | 25.140 | (d 11) | | |
| 12 | INFINITY | 0.300 | | |
| STO | INFINITY | −0.300 | | |
| 14 | 6.408 | 1.500 | 1.49700 | 81.608 |
| 15 | −52.628 | 1.200 | | |
| 16 (ASP) | 10.821 | 1.686 | 1.80139 | 45.450 |
| 17 | −15.160 | 0.450 | 1.80610 | 33.269 |
| 18 | 6.586 | (d 18) | | |
| 19 | 34.203 | 1.000 | 1.49700 | 81.608 |
| 20 | −34.203 | (d 20) | | |
| 21 (ASP) | 15.000 | 1.970 | 1.77377 | 47.167 |
| 22 | −29.992 | 0.449 | 1.80518 | 25.456 |
| 23 | 52.222 | (d 23) | | |
| 24 | INFINITY | 0.300 | 1.51680 | 64.200 |
| 25 | INFINITY | 1.000 | | |
| IMG | INFINITY | | | |

When the magnification of the zoom lens 3 is changed between the wide-angle-end state and the telescopic-end state, the following inter-surface distances change: the inter-surface distance d5 between the first lens group GR1 and the second lens group GR2, the inter-surface distance d11 between the second lens group GR2 and the third lens group GR3, the inter-surface distance d18 between the third lens group GR3 and the fourth lens group GR4, the inter-surface distance d20 between the fourth lens group GR4 and the fifth lens group GR5, and the inter-surface distance d23 between the fifth lens group GR5 and the cover glass plate CG.

Table 8 shows the variable inter-surface distances in the wide-angle-end state, the intermediate-focal-length state, and the telescopic-end state along with the f-numbers Fno and the half imaging angles ω in Numerical Example 3.

TABLE 8

| f | 4.80 | 17.70 | 85.53 |
|---|---|---|---|
| Fno | 3.29 | 4.20 | 5.94 |
| ω | 40.55 | 12.23 | 2.56 |
| d 5 | 0.351 | 15.075 | 27.079 |
| d 11 | 18.242 | 6.477 | 0.450 |
| d 18 | 5.629 | 2.362 | 0.500 |
| d 20 | 2.838 | 7.908 | 23.001 |
| d 23 | 4.770 | 9.390 | 3.986 |

In the zoom lens 3, the following surfaces are aspheric surfaces: both surfaces (sixth and seventh surfaces) of the negative lens G4 in the second lens group GR2, both surfaces (tenth and eleventh surfaces) of the positive lens G6 in the second lens group GR2, the object-side surface (sixteenth surface) of the positive lens G8 in the third lens group GR3, and the object-side surface (twenty first surface) of the positive lens G11 in the fifth lens group GR5. Table 9 shows the fourth, sixth, eighth, and tenth aspheric coefficients A, B, C, D and the conic constants K of the aspheric surfaces in Numerical Example 3.

TABLE 9

| si | K | A | B | C | D |
|---|---|---|---|---|---|
| 6 | 0.00000E+00 | 1.96214E−05 | −8.15292E−06 | 7.73064E−08 | 8.80942E−11 |
| 7 | 0.00000E+00 | −9.27232E−05 | −5.60063E−06 | 4.95224E−08 | −3.05057E−08 |
| 10 | −2.64849E+00 | −1.64181E−04 | 1.85119E−05 | −7.79701E−07 | 0.00000E+00 |
| 11 | 0.00000E+00 | −5.14569E−04 | 2.00736E−05 | −1.00151E−06 | 7.73092E−09 |
| 16 | 0.00000E+00 | −5.16424E−04 | −1.04692E−05 | −4.58026E−07 | 0.00000E+00 |
| 21 | 0.00000E+00 | −1.68363E−05 | 1.38085E−06 | −1.98138E−08 | 2.19798E−11 |

Figure 8:
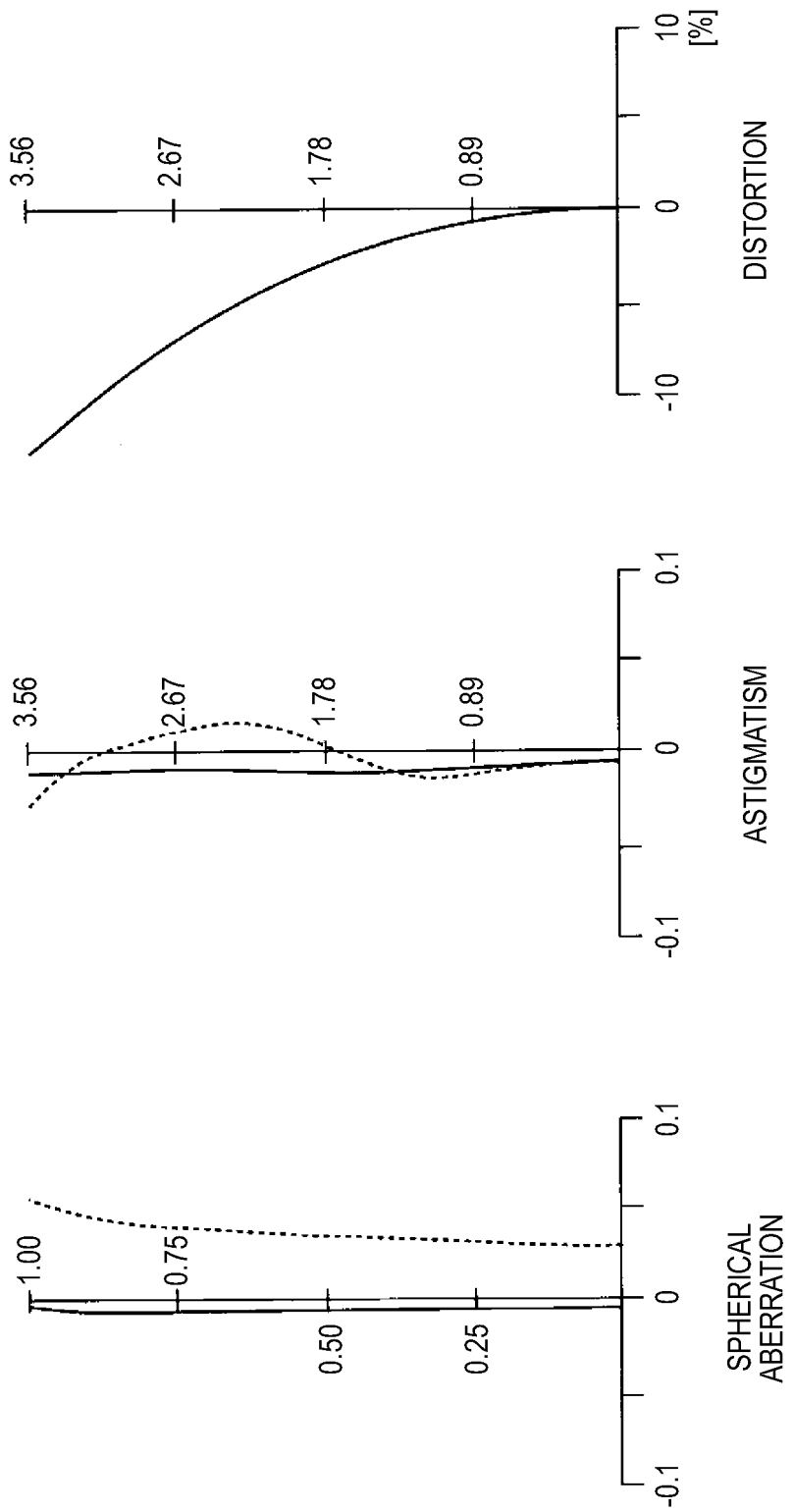
FIG. 8, along with FIG. 9, is aberration diagrams in a numerical example in which specific values are used in Third Example and shows spherical aberration, astigmatism, and distortion in the wide-angle-end state.
Figure 9:
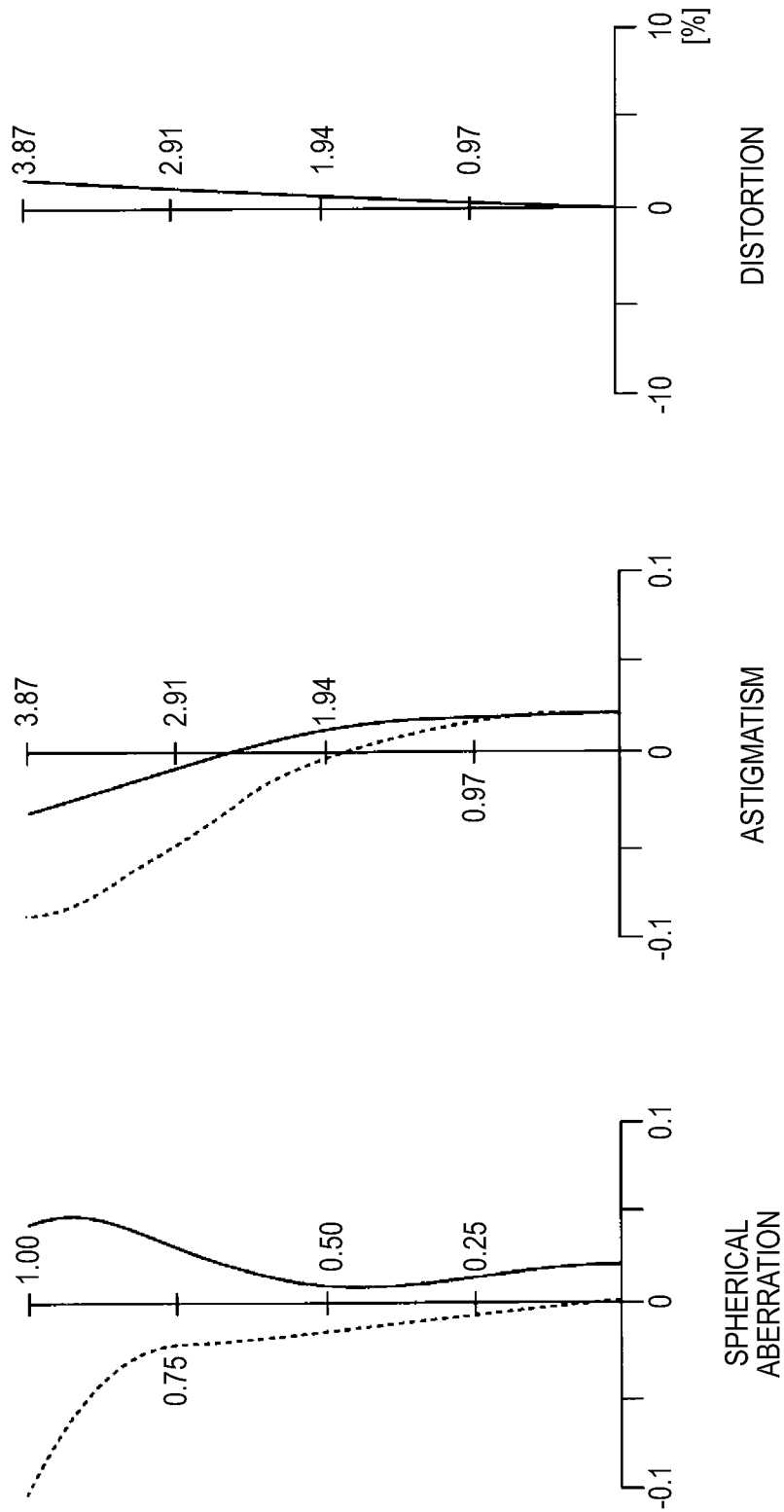
FIG. 9 shows spherical aberration, astigmatism, and distortion in the telescopic-end state.

FIGS. 8 and 9 are aberration diagrams in a state in which an infinite point is brought into focus in Numerical Example 3. FIG. 8 is aberration diagrams in the wide-angle-end state, and FIG. 9 is aberration diagrams in the telescopic-end state.

In the spherical aberration diagrams in FIGS. 8 and 9, the solid lines represent spherical aberration values at the d line (wavelength of 587.6 nm) and the broken lines represent spherical aberration values at the g line (wavelength of 435.8 nm). In the astigmatism diagrams in FIGS. 8 and 9, the solid lines represent astigmatism values in the sagittal image plane, and the broken lines represent astigmatism values in the meridional image plane.

The aberration diagrams clearly show that the aberrations have been well corrected and excellent imaging performance has been achieved in Numerical Example 3.

Fourth Example

Figure 10:
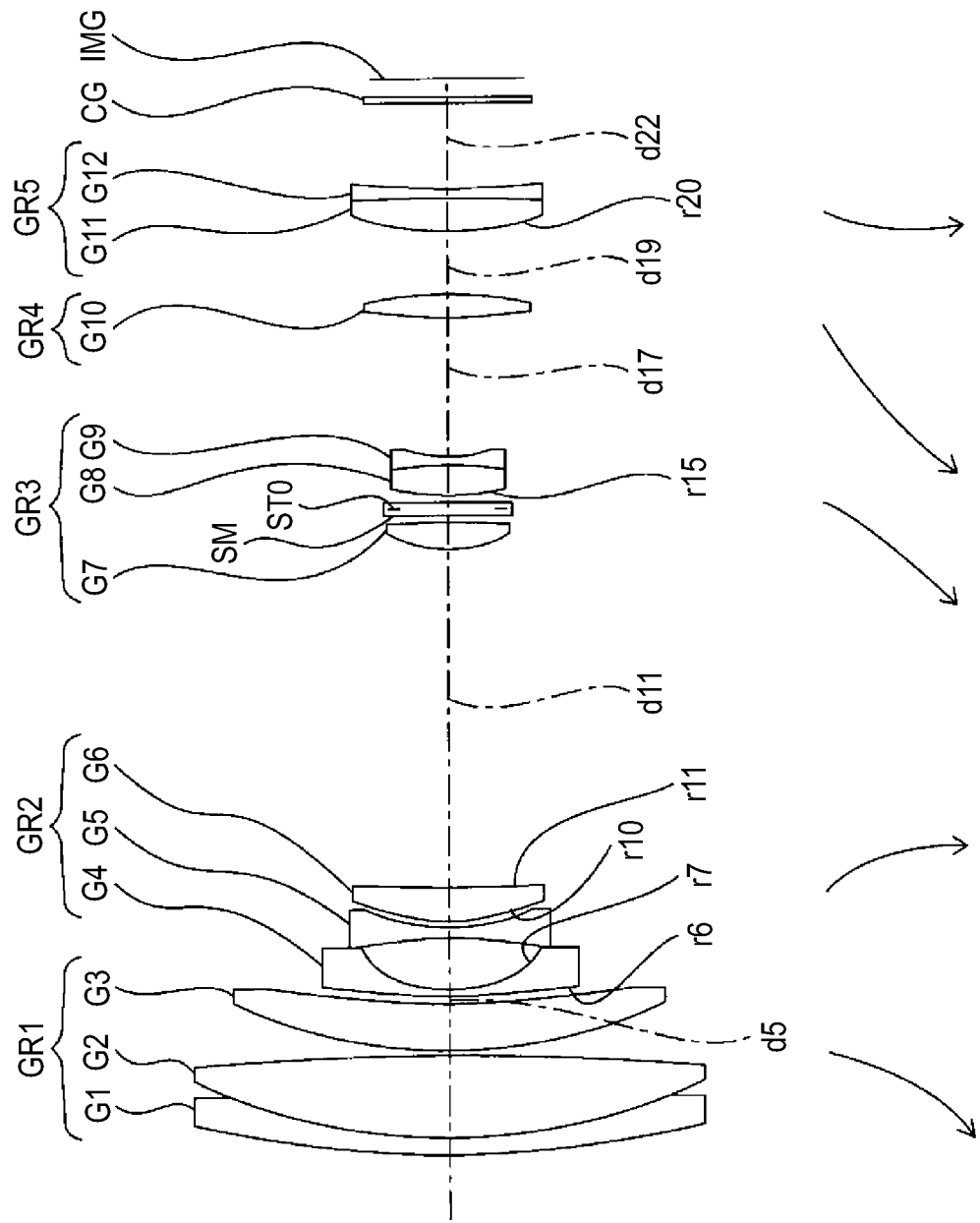
FIG. 10 shows the lens configuration of Fourth Example of the zoom lens.

FIG. 10 shows the lens configuration of a zoom lens 4 in Fourth Example of the present technology.

The zoom lens 4 includes a first lens group GR1 having positive refracting power, a second lens group GR2 having negative refracting power, a third lens group GR3 having positive refracting power, a fourth lens group GR4 having positive refracting power, and a fifth lens group GR5 having positive refracting power arranged in this order from the object side toward the image side.

The zoom lens 4 has a zoom magnification factor set at 17.9.

The first lens group GR1 is formed of a doublet obtained by bonding a negative meniscus lens G1 with a convex surface on the object side to a positive biconvex lens G2, and a positive meniscus lens G3 with a convex surface on the object side arranged in this order from the object side toward the image side.

The second lens group GR2 is formed of a negative meniscus lens G4 with a convex surface on the object side, a negative biconcave lens G5, and a positive meniscus lens G6 with a convex surface on the object side arranged in this order from the object side toward the image side.

The third lens group GR3 is formed of a positive biconvex lens G7 and a doublet obtained by bonding a positive biconvex lens G8 positioned on the object side to a negative biconcave lens G9 positioned on the image side arranged in this order from the object side toward the image side.

An air separation is formed between the positive lens G7 and the positive lens G8 in the third lens group GR3, and a shutter mechanism SM is disposed in the air separation.

The fourth lens group GR4 is formed of a positive biconvex lens G10.

The fifth lens group GR5 is formed of a doublet obtained by bonding a positive biconvex lens G11 positioned on the object side to a negative biconcave lens G12 positioned on the image side.

A cover glass plate CG is disposed between the fifth lens group GR5 and an image plane IMG. An infrared cutoff filter or a variety of other filters may be disposed between the image plane IMG and the cover glass plate CG, or the cover glass plate CG can alternatively be configured to have the same function as that of the infrared cutoff filter or any other filter.

An aperture stop STO, which functions as an f-number determination member that determines the f-number of the light flux, is disposed between the positive lens G7 and the positive lens G8 in the third lens group GR3 and moved integrally therewith. The aperture stop STO is integrated with the shutter mechanism SM, and part of the shutter mechanism SM works as the aperture stop STO.

Table 10 shows lens data in Numerical Example 4 in which specific values are used in the zoom lens 4 in Fourth Example.

TABLE 10

| si | ri | di | ni | vi |
|---|---|---|---|---|
| 1 | 53.623 | 0.900 | 1.84666 | 23.780 |
| 2 | 31.445 | 4.600 | 1.49700 | 81.608 |
| 3 | −150.000 | 0.150 | | |
| 4 | 25.773 | 2.658 | 1.72916 | 54.674 |
| 5 | 54.674 | (d 5) | | |
| 6 (ASP) | 58.961 | 0.300 | 1.82080 | 42.706 |
| 7 (ASP) | 6.082 | 3.078 | | |
| 8 | −17.500 | 0.450 | 1.75500 | 52.323 |
| 9 | 9.934 | 0.250 | | |
| 10 (ASP) | 8.017 | 1.899 | 1.99229 | 20.880 |
| 11 (ASP) | 32.311 | (d 11) | | |
| 12 | 7.037 | 1.437 | 1.49700 | 81.608 |
| 13 | −42.753 | 0.753 | | |
| 14 | INFINITY | 0.753 | | |
| 15 (ASP) | 12.323 | 1.580 | 1.77377 | 47.167 |
| 16 | −18.528 | 0.450 | 1.80610 | 33.269 |
| 17 | 7.724 | (d 17) | | |
| 18 | 26.600 | 1.164 | 1.49700 | 81.608 |
| 19 | −26.600 | (d 19) | | |
| 20 (ASP) | 15.177 | 1.800 | 1.75501 | 51.158 |
| 21 | −51.953 | 0.400 | 1.84666 | 23.780 |
| 22 | 48.000 | (d 22) | | |
| 23 | INFINITY | 0.300 | 1.51680 | 64.200 |
| 24 | INFINITY | 1.000 | | |
| IMG | INFINITY | | | |

When the magnification of the zoom lens 4 is changed between the wide-angle-end state and the telescopic-end state, the following inter-surface distances change: the inter-surface distance d5 between the first lens group GR1 and the second lens group GR2, the inter-surface distance d11 between the second lens group GR2 and the third lens group GR3, the inter-surface distance d17 between the third lens group GR3 and the fourth lens group GR4, the inter-surface distance d19 between the fourth lens group GR4 and the fifth lens group GR5, and the inter-surface distance d22 between the fifth lens group GR5 and the cover glass plate CG.

Table 11 shows the variable inter-surface distances in the wide-angle-end state, the intermediate-focal-length state, and the telescopic-end state along with the f-numbers Fno and the half imaging angles ω in Numerical Example 4.

TABLE 11

| f | 4.77 | 17.47 | 85.66 |
|---|---|---|---|
| Fno | 3.30 | 4.25 | 5.95 |
| ω | 40.55 | 12.39 | 2.56 |
| d 5 | 0.350 | 14.585 | 27.105 |
| d 11 | 18.332 | 6.440 | 0.450 |
| d 17 | 7.650 | 2.578 | 0.700 |
| d 19 | 3.493 | 11.517 | 25.222 |
| d 22 | 4.779 | 8.380 | 4.001 |

In the zoom lens 4, the following surfaces are aspheric surfaces: both surfaces (sixth and seventh surfaces) of the negative lens G4 in the second lens group GR2, both surfaces (tenth and eleventh surfaces) of the positive lens G6 in the second lens group GR2, the object-side surface (fifteenth surface) of the positive lens G8 in the third lens group GR3, and the object-side surface (twentieth surface) of the positive lens G11 in the fifth lens group GR5. Table 12 shows the fourth, sixth, eighth, and tenth aspheric coefficients A, B, C, D and the conic constants K of the aspheric surfaces in Numerical Example 4.

TABLE 12

| si | K | A | B | C | D |
|---|---|---|---|---|---|
| 6 | 0.00000E+00 | 3.79802E−04 | −9.76334E−06 | 2.26115E−08 | 6.39071E−10 |
| 7 | 0.00000E+00 | 1.03280E−05 | 7.29096E−06 | 2.13937E−07 | −2.19309E−08 |
| 10 | −2.99998E+00 | −3.03933E−04 | 1.92588E−05 | −3.57961E−07 | 0.00000E+00 |
| 11 | 0.00000E+00 | −5.99673E−04 | 1.53190E−05 | −4.69852E−07 | 4.28315E−09 |
| 15 | 0.00000E+00 | −4.42956E−04 | −7.02846E−06 | −3.50795E−07 | 0.00000E+00 |
| 20 | 0.00000E+00 | −1.42710E−05 | 4.99137E−07 | 1.72534E−08 | −5.09539E−10 |

Figure 11:
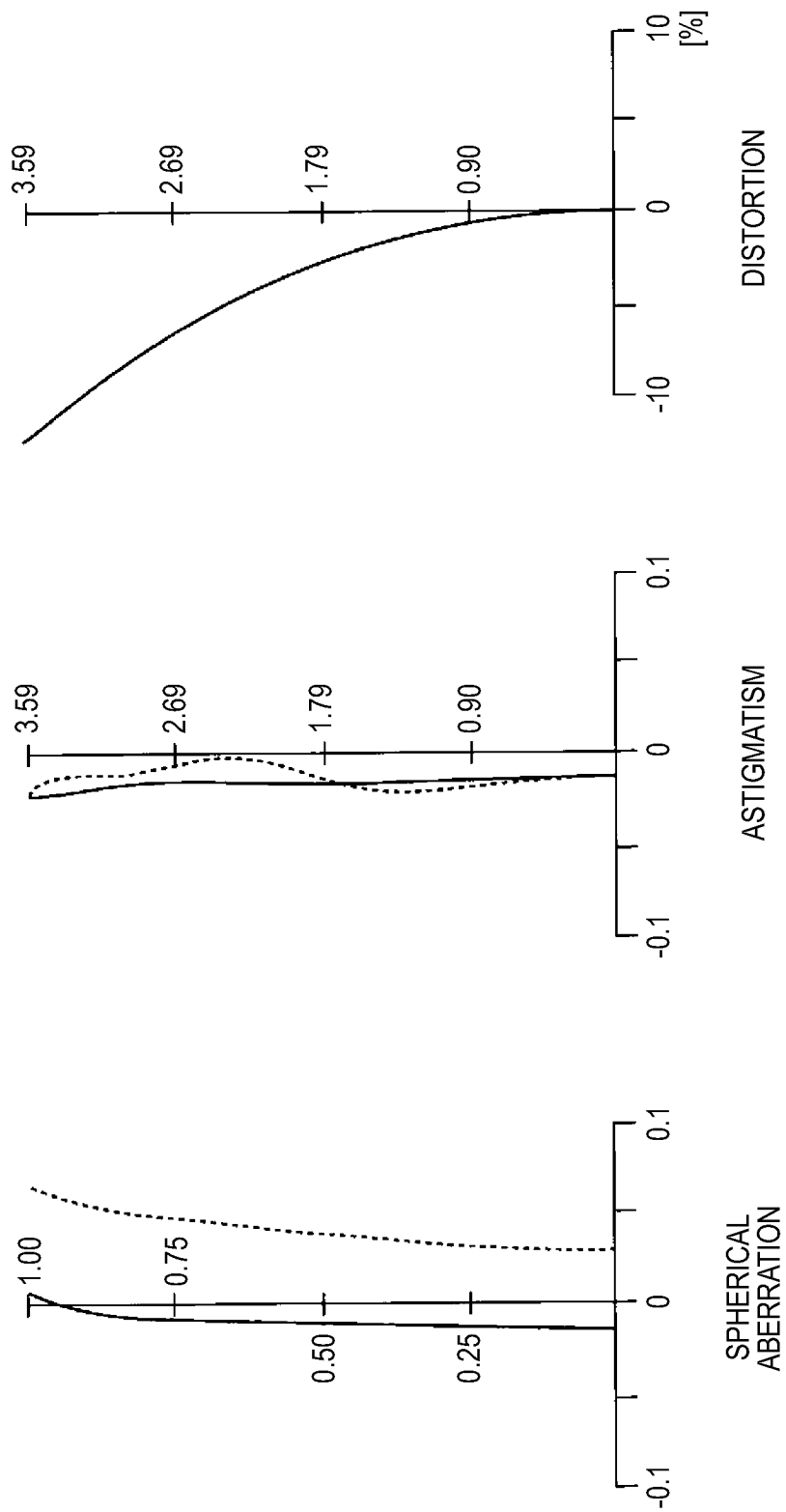
FIG. 11, along with FIG. 12, is aberration diagrams in a numerical example in which specific values are used in Fourth Example and shows spherical aberration, astigmatism, and distortion in the wide-angle-end state.
Figure 12:
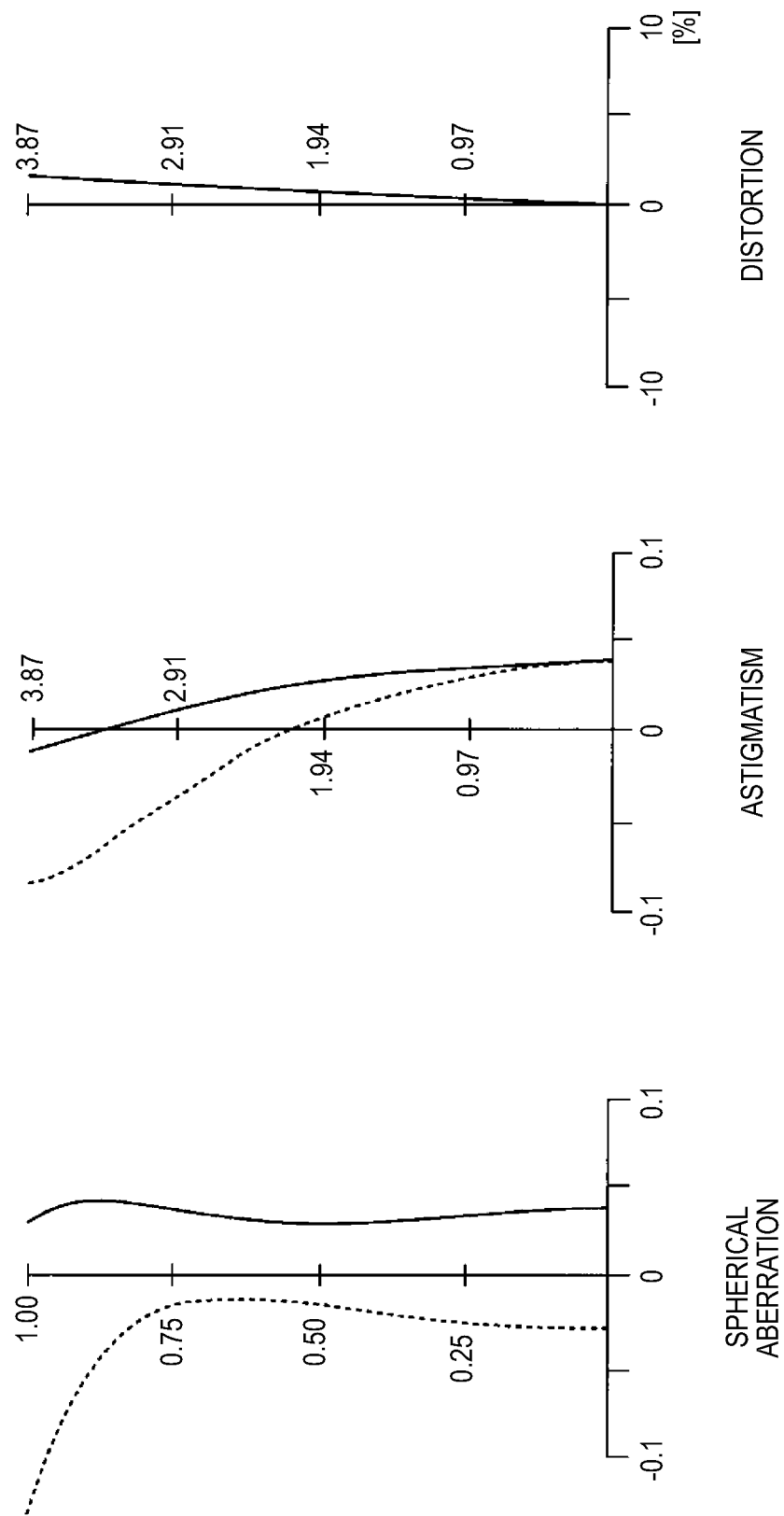
FIG. 12 and shows spherical aberration, astigmatism, and distortion in the telescopic-end state.

FIGS. 11 and 12 are aberration diagrams in a state in which an infinite point is brought into focus in Numerical Example 4. FIG. 11 is aberration diagrams in the wide-angle-end state, and FIG. 12 is aberration diagrams in the telescopic-end state.

In the spherical aberration diagrams in FIGS. 11 and 12, the solid lines represent spherical aberration values at the d line (wavelength of 587.6 nm) and the broken lines represent spherical aberration values at the g line (wavelength of 435.8 nm). In the astigmatism diagrams in FIGS. 11 and 12, the solid lines represent astigmatism values in the sagittal image plane, and the broken lines represent astigmatism values in the meridional image plane.

The aberration diagrams clearly show that the aberrations have been well corrected and excellent imaging performance has been achieved in Numerical Example 4.

[Values in Zoom Lens Conditional Expressions]

A description will be made of values in the conditional expressions for the zoom lenses according to Examples of the present technology.

Table 13 shows values in the conditional expressions (1) to (5) for the zoom lenses 1 to 4.

Table 13 clearly shows that the zoom lenses 1 to 4 are configured to satisfy the conditional expressions (1) to (5).

[Operation at the Time of Zooming]

In each of the zoom lenses according to Examples of the present technology, the shutter mechanism or the shutter mechanism and the f-number determination member are disposed in the air separation formed in the third lens group so that the space in the zoom lens is used effectively. The effective use of the space allows the shutter mechanism or the f-number determination member not to be disposed between lens groups, whereby the distance between the second and third lens groups and the distance between the third and fourth lens groups in the telescopic-end zoom position can be reduced accordingly.

The travels over which the second to fourth lens groups are moved at the time of zooming can therefore be increased, whereby a high magnification factor, a wide imaging angle, and a compact size resulting from the reduction in the total length of the optical system are achieved.

Figure 13:
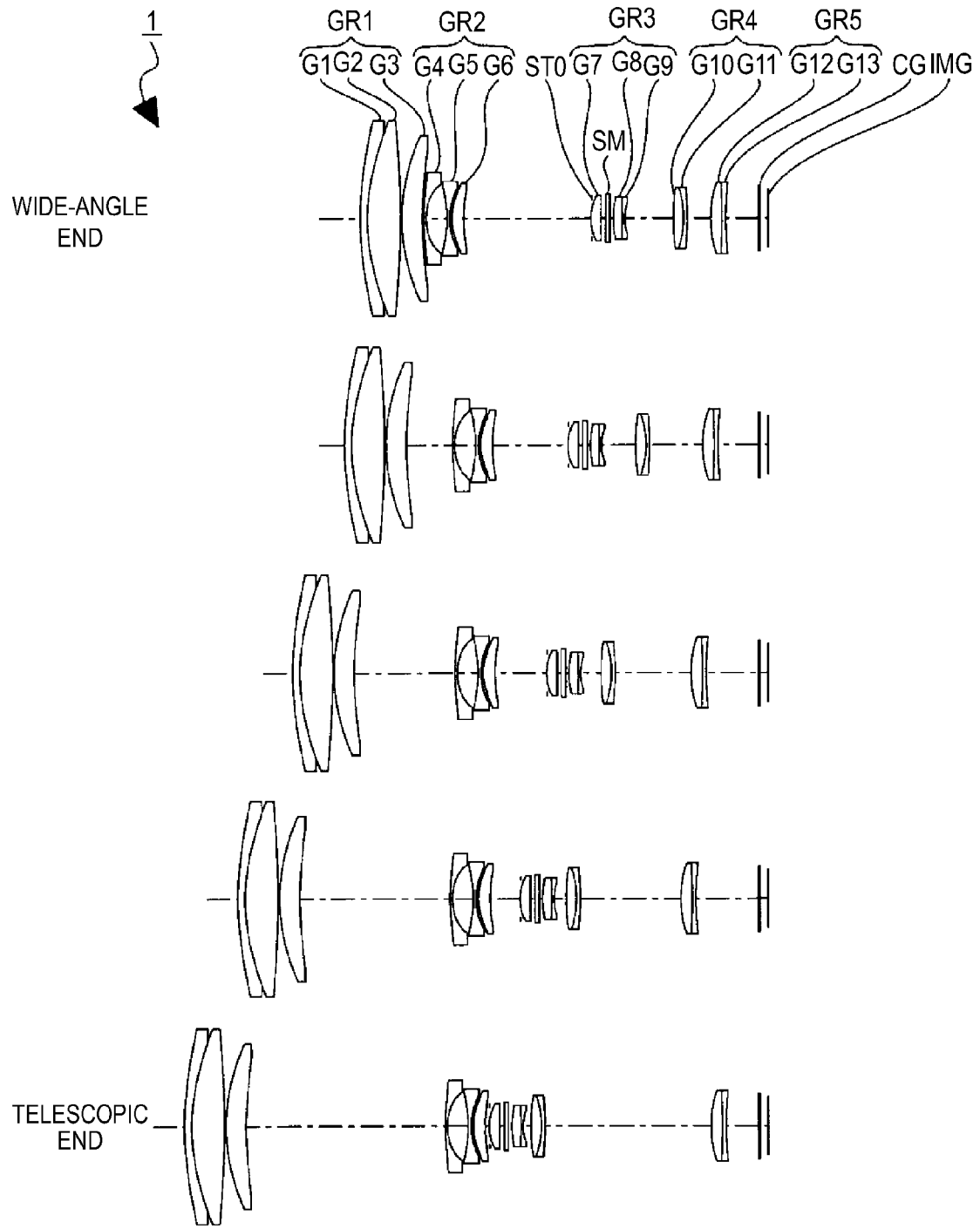
FIG. 13 shows operation at the time of zooming.

FIG. 13 shows positions of the lens groups when they are moved between the wide-angle end and the telescopic end of the zoom lens 1 by way of example. In the zoom lens 1, the second lens group and the third lens group approach each other and the third lens group and the fourth lens group approach each other in the telescopic-end zoom position, as shown in FIG. 13.

Further, since each of the zoom lenses according to Examples of the present technology is configured to satisfy the conditional expression (1), the distance along the optical axis between the surface in the second lens group that is closest to an image to be formed and the surface in the third lens group that is closest to an object to be imaged in the telescopic-end zoom position is so optimized that sufficient magnification changing ability is ensured, whereby a high magnification factor, a wide imaging angle, and a compact size are achieved, and the adjacent lenses will not come into contact with each other, as described above.

Moreover, since each of the zoom lenses according to Examples of the present technology is configured to satisfy

TABLE 13

| | | Zoom lens 1 | Zoom lens 2 | Zoom lens 3 | Zoom lens 4 |
|---|---|---|---|---|---|
| | D (T, 2-3) | 0.45 | 0.45 | 0.450 | 0.45 |
| | fw | 4.78 | 4.78 | 4.796 | 4.77 |
| Conditional expression (1) | 4.5 < 100 × D (T, 2-3)/fw < 15.0 | 9.42 | 9.42 | 9.38 | 9.43 |
| | d (3, air) | 1.650 | 1.650 | 1.200 | 1.506 |
| Conditional expression (2) | 2.0 < d (3, air)/D (T, 2-3) | 3.67 | 3.67 | 2.67 | 3.35 |
| | D (T, 3-4) | 0.70 | 0.70 | 0.500 | 0.70 |
| Conditional expression (3) | 5.0 < 100 × D (T, 3-4)/fw < 20.0 | 14.65 | 14.65 | 10.43 | 14.67 |
| | f3 | 15.56 | 15.67 | 14.756 | 16.06 |
| Conditional expression (4) | 2.5 < f3/fw < 4.0 | 3.26 | 3.28 | 3.08 | 3.37 |
| | D (W, 2-4) | 36.51 | 37.60 | 35.555 | 38.10 |
| | D (T, 2-4) | 13.21 | 13.32 | 12.633 | 13.26 |
| Conditional expression (5) | 4.2 < [D (W, 2-4) − D (T, 2-4)]/fw < 5.6 | 4.88 | 5.08 | 4.78 | 5.20 | the conditional expression (3), the distance along the optical axis between the surface in the third lens group that is closest to an image to be formed and the surface in the fourth lens group that is closest to an object to be imaged in the telescopic-end zoom position is so optimized that sufficient magnification changing ability is ensured, whereby a high magnification factor and a compact size are achieved, and the adjacent lenses will not come into contact with each other, as described above.

[Configuration of Imaging Apparatus]

An imaging apparatus according to an embodiment of the present technology includes a zoom lens and an imaging device that converts an optical image formed by the zoom lens into an electric signal, and the zoom lens includes a first lens group having positive refracting power, a second lens group having negative refracting power, a third lens group having positive refracting power, a fourth lens group having positive refracting power, and a fifth lens group having positive refracting power arranged in this order from the object side toward the image side.

When the zoom lens in the imaging apparatus according to the embodiment of the present technology undergoes zooming operation from the wide-angle end toward the telescopic end, the first lens group moves away from the second lens group toward an object to be imaged, the third lens group approaches the second lens group toward the object, and the fourth lens group approaches the third lens group toward the object.

The configuration of the zoom lens not only maximizes magnification changing ability of the second to fourth lens groups, which greatly contribute to change in magnification of the optical system at the time of zooming, but also shortens the total length of the optical system and reduces the size of the zoom lens.

Further, the zoom lens in the imaging apparatus according to the embodiment of the present technology satisfies the following conditional expression (1):

$$4.5 < 100 \times D(T, 2-3)/fW < 15 \tag{1}$$

where $D(T, 2-3)$ represents the distance along the optical axis between the surface in the second lens group that is closest to an image to be formed and the surface in the third lens group that is closest to an object to be imaged in the telescopic-end zoom position, and $fW$ represents the focal length of the entire optical system in the wide-angle-end zoom position.

The conditional expression (1) defines the distance between the second lens group and the third lens group in the telescopic-end zoom position.

When $100 \times D(T, 2-3)/fW$ in the conditional expression (1) is greater than the upper limit, it is difficult to increase the travels over which the second, third, and fourth lens groups are moved at the time of zooming, resulting in insufficient magnification changing ability and imaging angle and increase in size of the optical system to achieve sufficient magnification changing ability.

On the other hand, when $100 \times D(T, 2-3)/fW$ in the conditional expression (1) is smaller than the lower limit, the adjacent lens groups approach too close each other in the telescopic-end zoom position, possibly resulting in contact between the adjacent lenses due to vibration or impact produced when the imaging apparatus is used or carried by the user.

When the zoom lens satisfied the conditional expression (1), the distance along the optical axis between the surface in the second lens group that is closest to an image to be formed and the surface in the third lens group that is closest to an object to be imaged in the telescopic-end zoom position is so optimized that sufficient magnification changing capability is ensured, whereby a high magnification factor, a wide imaging angle, and a compact size are achieved, and the adjacent lenses will not come into contact with each other.

The term $100 \times D(T, 2-3)/fW$ in the conditional expression (1) is more preferably greater than 8.5 but smaller than 10.5.

When $100 \times D(T, 2-3)/fW$ in the conditional expression (1) falls within the range described above, a higher magnification factor, a wider imaging angle, and a more compact size are achieved.

[Embodiment of Imaging Apparatus]

FIG. 14 is a block diagram showing a digital still camera as the imaging apparatus according to the embodiment of the present technology.

An imaging apparatus (digital still camera) 100 includes a camera block 10 responsible for imaging capability, a camera signal processor 20 that performs analog-digital conversion and other signal processing on a captured image signal, and an image processor 30 that records and reproduces the image signal. The imaging apparatus 100 further includes an LCD (liquid crystal display) 40 that displays a captured image and other information, a R/W (reader/writer) 50 that writes and reads the image signal to and from a memory card 1000, a CPU (central processing unit) 60 that controls the entire imaging apparatus, an input unit 70 formed of a variety of switches and other components operated by the user as necessary, and a lens drive controller 80 that controls and drives lenses disposed in the camera block 10.

The camera block 10 is formed of an optical system including a zoom lens 11 (any of the zoom lenses 1, 2, 3, and 4 to which the present technology is applied) and an imaging device 12, such as a CCD (charge coupled device) and a CMOS (complementary metal-oxide semiconductor) device.

The camera single processor 20 converts an output signal from the imaging device 12 into a digital signal, performs noise removal and image quality correction, converts the digital signal into brightness/color difference signals, and performs a variety of other signal processing.

The image processor 30 performs compression encoding and decompression decoding on an image signal based on a predetermined image data format, performs data format conversion, such as resolution conversion, and performs other types of image processing.

The LCD 40 has a function of displaying a variety of data, such as user's operation through the input unit 70 and captured images.

The R/W 50 writes image data encoded by the image processor 30 to the memory card 1000 and reads image data recorded on the memory card 1000.

The CPU 60 functions as a control processor that controls circuit blocks provided in the imaging apparatus 100 and controls each of the circuit blocks based, for example, on an instruction input signal from the input unit 70.

The input unit 70 is formed, for example, of a shutter release button for shutter operation and a selection switch for selecting an action mode and outputs an instruction input signal according to user's operation to the CPU 60.

The lens drive controller 80 controls a motor or any other actuator (not shown) that drives lenses in the zoom lens 11 based on a control signal from the CPU 60.

The memory card 1000 is, for example, a semiconductor memory that can be attached and detached to and from a slot connected to the R/W 50.

The action of the imaging apparatus 100 will next be described.

In an imaging standby state, an image signal captured by the camera block 10 is outputted to the LCD 40 through the camera single processor 20 and displayed as a camera-through image on the LCD 40 under the control of the CPU 60. When a zooming instruction input signal is inputted from the input unit 70, the CPU 60 outputs a control signal to the lens drive controller 80, and a predetermined lens in the zoom lens 11 is moved under the control of the lens drive controller 80.

When a shutter (not shown) in the camera block 10 is operated in response to an instruction input signal from the input unit 70, the camera signal processor 20 outputs a captured image signal to the image processor 30, which performs compression encoding on the image signal and converts the encoded image signal into digital data expressed in a predetermined data format. The converted data is outputted to the R/W 50, which writes the data to the memory card 1000.

Focusing is carried out, for example, as follows: When the shutter release button in the input unit 70 is pressed halfway or fully pressed for recording (imaging), the lens drive controller 80 moves a predetermined lens in the zoom lens 11 based on a control signal from the CPU 60.

To reproduce image data recorded on the memory card 1000, predetermined image data is read from the memory card 1000 through the R/W 50 in response to user's operation performed through the input unit 70. The image processor 30 performs decompression decoding on the read image data, and an image signal to be reproduced is then outputted to the LCD 40 and displayed thereon as a reproduced image.

The above embodiment has been described with reference to the case where the imaging apparatus is used as a digital still camera, but the imaging apparatus is not necessarily used as a digital still camera. The imaging apparatus can be widely used, for example, as a camera unit in a digital input/output apparatus, such as a digital video camcorder, a mobile phone equipped with a camera, and a PDA (personal digital assistant) equipped with a camera.

[Present Technology]

The present technology can be configured as follow:

<1> A zoom lens including a first lens group having positive refracting power, a second lens group having negative refracting power, a third lens group having positive refracting power, a fourth lens group having positive refracting power, and a fifth lens group having positive refracting power arranged in this order from the object side toward the image side, wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object, and the zoom lens satisfies the following conditional expression (1):

$$4.5<100\times D(T,2\text{-}3)/fW<15 \quad (1)$$

where D(T, 2–3) represents the distance along the optical axis between the surface in the second lens group that is closest to an image to be formed and the surface in the third lens group that is closest to the object to be imaged in the telescopic-end zoom position, and fW represents the focal length of the entire optical system in the wide-angle-end zoom position.

<2> The zoom lens described in <1>, wherein the third lens group is formed of at least two lenses and at least one air separation formed therebetween and satisfies the following conditional expression (2):

$$2.0<d(3,\text{air})/D(T,2\text{-}3) \quad (2)$$

where d(3, air) represents the largest of the air separations in the optical axis direction present in the third lens group.

<3> The zoom lens described in <1> or <2>, wherein the third lens group is formed of at least two lenses, at least one air separation formed therebetween, and a light-blocking shutter mechanism disposed in the air separation.

<4> The zoom lens described in any of <1> to <3>, wherein the third lens group is formed of at least two lenses, at least one air separation formed therebetween, a lens disposed closest to the object to be imaged and having a convex object-side surface, and an f-number determination member that determines the f-number of the light flux and is disposed in the air separation present between the vertex of the object-side surface of the lens in the third lens group that is closest to the object to be imaged and the vertex of the image-side surface of the lens in the third lens group that is closest to the image to be formed.

<5> The zoom lens described in any of <1> to <4>, wherein the zoom lens satisfies the following conditional expression (3):

$$5.0<100\times D(T,3\text{-}4)/fW<20 \quad (3)$$

where D(T, 3–4) represents the distance along the optical axis between the surface in the third lens group that is closest to the image to be formed and the surface in the fourth lens group that is closest to the object to be imaged.

<6> The zoom lens described in any of <1> to <5>, wherein the third lens group is formed of three lenses, a positive lens, a positive lens, and a negative lens arranged in this order from the object side toward the image side.

<7> The zoom lens described in any of <1> to <6>, wherein the zoom lens satisfies the following conditional expression (4):

$$2.5<f3/fW<4.0 \quad (4)$$

where f3 represents the focal length of the third lens group.

<8> The zoom lens described in any of <1> to <7>, wherein the second lens group is formed of three lenses, a negative lens, a negative lens, and a positive lens arranged in this order from the object side toward the image side.

<9> The zoom lens described in any of <1> to <8>, wherein the zoom lens satisfies the following conditional expression (5):

$$4.2<[D(W,2\text{-}4)\text{-}D(T,2\text{-}4)]/fW<5.6 \quad (5)$$

where D(W, 2–4) represents the distance along the optical axis between the surface in the second lens group that is closest to the object to be imaged and the surface in the fourth lens group that is closest to the image to be formed in the wide-angle-end zoom position, and D(T, 2–4) represents the distance along the optical axis between the surface in the second lens group that is closest to the object and the surface in the fourth lens group that is closest to the image in the telescopic-end zoom position.

<10> An imaging apparatus including a zoom lens and an imaging device that converts an optical image formed by the zoom lens into an electric signal, the zoom lens including a first lens group having positive refracting power, a second lens group having negative refracting power, a third lens group having positive refracting power, a fourth lens group having positive refracting power, and a fifth lens group having positive refracting power arranged in this order from the object side toward the image side, wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object, and the zoom lens satisfies the following conditional expression (1):

$$4.5 < 100 \times D(T, 2-3)/fW < 15 \quad (1)$$

where D(T, 2–3) represents the distance along the optical axis between the surface in the second lens group that is closest to an image to be formed and the surface in the third lens group that is closest to the object to be imaged in the telescopic-end zoom position, and fW represents the focal length of the entire optical system in the wide-angle-end zoom position.

The present technology can further be configured as follows:

<11> A zoom lens including a first lens group having positive refracting power, a second lens group having negative refracting power, a third lens group having positive refracting power, a fourth lens group having positive refracting power, and a fifth lens group having positive refracting power arranged in this order from the object side toward the image side, wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object, and the zoom lens satisfies the following conditional expression (6):

$$7.0 < D(W, 3-4)/D(T, 3-4) < 15 \quad (6)$$

where D(W,3–4) represents the inter-surface distance along the optical axis between the third lens group and the fourth lens group in the wide-angle-end zoom position, and D(T, 3–4) represents the inter-surface distance along the optical axis between the third lens group and the fourth lens group in the telescopic-end zoom position.

<12> The zoom lens described in <11>, wherein the fourth lens group includes a doublet formed of two lenses, a positive lens and a negative lens disposed in this order from the object side toward the image side.

<13> The zoom lens described in <12>, wherein the fourth lens group works as an eccentricity correction lens group that is moved in the direction perpendicular to the optical axis.

<14> The zoom lens described in <11>, wherein the fourth lens group is formed of a single positive lens.

<15> The zoom lens described in <14>, wherein the fourth lens group works as an eccentricity correction lens group that is moved in the direction perpendicular to the optical axis.

<16> The zoom lens described in <14>, wherein the fourth lens group satisfies the following conditional expression (7):

$$vd4 > 80 \quad (7)$$

where vd4 represents the Abbe number of the material of the positive lens that forms the fourth lens group at the d line.

<17> The zoom lens described in <16>, wherein the fourth lens group works as an eccentricity correction lens group that is moved in the direction perpendicular to the optical axis.

<18> The zoom lens described in <11>, wherein the zoom lens satisfies the following conditional expression (8):

$$5.0 < f4/fW < 10 \quad (8)$$

where f4 represents the focal length of the fourth lens group, and fW represents the focal length of the entire optical system in the wide-angle-end zoom position.

<19> The zoom lens described in <11>, wherein the second lens group is formed of three lenses, a negative lens, a negative lens, and a positive lens arranged in this order from the object side toward the image side.

<20> The zoom lens described in <11>, wherein the zoom lens satisfies the following conditional expression (9):

$$1.25 < |f2|/fW < 1.5 \quad (9)$$

where f2 represents the focal length of the second lens group, and fW represents the focal length of the entire optical system in the wide-angle-end zoom position.

<21> The zoom lens described in <11>, wherein the third lens group is formed of three lenses, a positive lens, a positive lens, and a negative lens arranged in this order from the object side toward the image side.

<22> The zoom lens described in <11>, wherein the zoom lens satisfies the following conditional expression (10):

$$2.5 < f3/fW < 3.5 \quad (10)$$

where f3 represents the focal length of the third lens group, and fW represents the focal length of the entire optical system in the wide-angle-end zoom position.

<23> The zoom lens described in <11>, wherein the zoom lens satisfies the following conditional expression (11):

$$2.5 < 100 \times (f34W/f34T)/ZWT < 3.5 \quad (11)$$

where f34W represents the combined focal length of the third lens group and the fourth lens group in the wide-angle-end zoom position, f34T represents the combined focal length of the third lens group and the fourth lens group in the telescopic-end zoom position, and ZWT represents the focal length zoom magnification factor from the wide-angle end to the telescopic end.

<24> An imaging apparatus including a zoom lens and an imaging device that converts an optical image formed by the zoom lens into an electric signal, the zoom lens including a first lens group having positive refracting power, a second lens group having negative refracting power, a third lens group having positive refracting power, a fourth lens group having positive refracting power, and a fifth lens group having positive refracting power arranged in this order from the object side toward the image side, wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object, and the zoom lens satisfies the following conditional expression (6):

$$7.0 < D(W, 3-4)/D(T, 3-4) < 15 \quad (6)$$

where D(W,3–4) represents the inter-surface distance along the optical axis between the third lens group and the fourth lens group in the wide-angle-end zoom position, and D(T, 3–4) represents the inter-surface distance along the optical axis between the third lens group and the fourth lens group in the telescopic-end zoom position.

The present technology can further be configured as follows:

<31> A zoom lens including a first lens group having positive refracting power, a second lens group having negative refracting power, a third lens group having positive refracting power, a fourth lens group having positive refracting power, and a fifth lens group having positive refracting power arranged in this order from the object side toward the image side, wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object, and the zoom lens satisfies the following conditional expression (6):

$$7.0<D(W,3-4)/D(T,3-4)<15 \tag{6}$$

where D(W,3-4) represents the inter-surface distance along the optical axis between the third lens group and the fourth lens group in the wide-angle-end zoom position, and D(T, 3-4) represents the inter-surface distance along the optical axis between the third lens group and the fourth lens group in the telescopic-end zoom position.

<32> The zoom lens described in <31>, wherein the fourth lens group includes a doublet formed of two lenses, a positive lens and a negative lens disposed in this order from the object side toward the image side.

<33> The zoom lens described in <32>, wherein the fourth lens group works as an eccentricity correction lens group that is moved in the direction perpendicular to the optical axis.

<34> The zoom lens described in <31>, wherein the fourth lens group is formed of a single positive lens.

<35> The zoom lens described in <34>, wherein the fourth lens group works as an eccentricity correction lens group that is moved in the direction perpendicular to the optical axis.

<36> The zoom lens described in <34>, wherein the fourth lens group satisfies the following conditional expression (7):

$$vd4>80 \tag{7}$$

where vd4 represents the Abbe number of the material of the positive lens that forms the fourth lens group at the d line.

<37> The zoom lens described in <36>, wherein the fourth lens group works as an eccentricity correction lens group that is moved in the direction perpendicular to the optical axis.

<38> The zoom lens described in any of <31> to <37>, wherein the zoom lens satisfies the following conditional expression (8):

$$5.0<f4/fW<10 \tag{8}$$

where f4 represents the focal length of the fourth lens group, and fW represents the focal length of the entire optical system in the wide-angle-end zoom position.

<39> The zoom lens described in any of <31> to <38>, wherein the second lens group is formed of three lenses, a negative lens, a negative lens, and a positive lens arranged in this order from the object side toward the image side.

<40> The zoom lens described in any of <31> to <39>, wherein the zoom lens satisfies the following conditional expression (9):

$$1.25<|f2|/fW<1.5 \tag{9}$$

where f2 represents the focal length of the second lens group, and fW represents the focal length of the entire optical system in the wide-angle-end zoom position.

<41> The zoom lens described in any of <31> to <40>, wherein the third lens group is formed of three lenses, a positive lens, a positive lens, and a negative lens arranged in this order from the object side toward the image side.

<42> The zoom lens described in any of <31> to <41>, wherein the zoom lens satisfies the following conditional expression (10):

$$2.5<f3/fW<3.5 \tag{10}$$

where f3 represents the focal length of the third lens group, and fW represents the focal length of the entire optical system in the wide-angle-end zoom position.

<43> The zoom lens described in any of <31> to <42>, wherein the zoom lens satisfies the following conditional expression (11):

$$2.5<100\times(f34W/f34T)/ZWT<3.5 \tag{11}$$

where f34W represents the combined focal length of the third lens group and the fourth lens group in the wide-angle-end zoom position, f34T represents the combined focal length of the third lens group and the fourth lens group in the telescopic-end zoom position, and ZWT represents the focal length zoom magnification factor from the wide-angle end to the telescopic end.

<44> An imaging apparatus including a zoom lens and an imaging device that converts an optical image formed by the zoom lens into an electric signal, the zoom lens including a first lens group having positive refracting power, a second lens group having negative refracting power, a third lens group having positive refracting power, a fourth lens group having positive refracting power, and a fifth lens group having positive refracting power arranged in this order from the object side toward the image side, wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object, and the zoom lens satisfies the following conditional expression (6):

$$7.0<D(W,3-4)/D(T,3-4)<15 \tag{6}$$

where D(W,3-4) represents the inter-surface distance along the optical axis between the third lens group and the fourth lens group in the wide-angle-end zoom position, and D(T, 3-4) represents the inter-surface distance along the optical axis between the third lens group and the fourth lens group in the telescopic-end zoom position.

The shapes and values of the components shown in Examples described above are presented only by way of example for implementing the present technology and should not be used to construe the technical range of the present technology in a limited sense.

The present disclosure contains subject matter related to those disclosed in Japanese Priority Patent Applications JP 2011-057058 and JP 2011-057059 both filed in the Japan Patent Office on Mar. 15, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
   a first lens group having positive refracting power;
   a second lens group having negative refracting power;
   a third lens group having positive refracting power;
   a fourth lens group having positive refracting power; and
   a fifth lens group having positive refracting power arranged in this order from an object side toward an image side,
   wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object, the third lens group is formed of at least two lenses and at least one air separation formed therebetween,
the zoom lens satisfies the following conditional expression (1)

$$4.5 < 100 \times D(T, 2-3)/fW < 15 \quad (1),$$

and
the third lens group satisfies the following conditional expression (2)

$$2.0 < d(3, \text{air})/D(T, 2-3) \quad (2)$$

where D(T, 2–3) represents the distance along an optical axis between the surface in the second lens group that is closest to an image to be formed and the surface in the third lens group that is closest to the object to be imaged in the telescopic-end zoom position, and fW represents the focal length of the entire optical system in the wide-angle-end zoom position, and
where d(3, air) represents the largest of air separations in the optical axis direction present in the third lens group.

2. The zoom lens according to claim 1,
wherein the third lens group is formed of at least two lenses, at least one air separation formed therebetween, a lens disposed closest to the object to be imaged and having a convex object-side surface, and an f-number determination member that determines the f-number of a light flux and is disposed in the air separation present between the vertex of the object-side surface of the lens in the third lens group that is closest to the object to be imaged and the vertex of the image-side surface of the lens in the third lens group that is closest to the image to be formed.

3. The zoom lens according to claim 1,
wherein the zoom lens satisfies the following conditional expression (3)

$$5.0 < 100 \times D(T, 3-4)/fW < 20 \quad (3)$$

where D(T, 3–4) represents the distance along the optical axis between the surface in the third lens group that is closest to the image to be formed and the surface in the fourth lens group that is closest to the object to be imaged.

4. The zoom lens according to claim 1,
wherein the third lens group is formed of three lenses, a positive lens, a positive lens, and a negative lens arranged in this order from the object side toward the image side.

5. The zoom lens according to claim 1,
wherein the zoom lens satisfies the following conditional expression (4)

$$2.5 < f3/fW < 4.0 \quad (4)$$

where f3 represents the focal length of the third lens group.

6. The zoom lens according to claim 1,
wherein the second lens group is formed of three lenses, a negative lens, a negative lens, and a positive lens arranged in this order from the object side toward the image side.

7. The zoom lens according to claim 1, wherein the zoom lens further satisfies the following conditional expression (1')

$$8.5 < 100 \times D(T, 2-3)/fW < 10.5. \quad (1')$$

8. An imaging apparatus comprising:
the zoom lens according to claim 1; and
an imaging device that converts an optical image formed by the zoom lens into an electric signal.

9. A zoom lens comprising:
a first lens group having positive refracting power;
a second lens group having negative refracting power;
a third lens group having positive refracting power;
a fourth lens group having positive refracting power; and
a fifth lens group having positive refracting power arranged in this order from an object side toward an image side,
wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object,
the third lens group is formed of at least two lenses, at least one air separation formed therebetween, and a light-blocking shutter mechanism disposed in the air separation, and
the zoom lens satisfies the following conditional expression (1)

$$4.5 < 100 \times D(T, 2-3)/fW < 15 \quad (1)$$

where D(T, 2–3) represents the distance along an optical axis between the surface in the second lens group that is closest to an image to be formed and the surface in the third lens group that is closest to the object to be imaged in the telescopic-end zoom position, and fW represents the focal length of the entire optical system in the wide-angle-end zoom position.

10. The zoom lens according to claim 9,
wherein the third lens group is formed of at least two lenses, at least one air separation formed therebetween, a lens disposed closest to the object to be imaged and having a convex object-side surface, and an f-number determination member that determines the f-number of a light flux and is disposed in the air separation present between the vertex of the object-side surface of the lens in the third lens group that is closest to the object to be imaged and the vertex of the image-side surface of the lens in the third lens group that is closest to the image to be formed.

11. The zoom lens according to claim 9,
wherein the zoom lens satisfies the following conditional expression (3)

$$5.0 < 100 \times D(T, 3-4)/fW < 20 \quad (3)$$

where D(T, 3–4) represents the distance along the optical axis between the surface in the third lens group that is closest to the image to be formed and the surface in the fourth lens group that is closest to the object to be imaged.

12. The zoom lens according to claim 9,
wherein the third lens group is formed of three lenses, a positive lens, a positive lens, and a negative lens arranged in this order from the object side toward the image side.

13. The zoom lens according to claim 9,
wherein the zoom lens satisfies the following conditional expression (4)

$$2.5 < f3/fW < 4.0 \quad (4)$$

where f3 represents the focal length of the third lens group.

14. The zoom lens according to claim 9,
wherein the second lens group is formed of three lenses, a negative lens, a negative lens, and a positive lens arranged in this order from the object side toward the image side.

15. The zoom lens according to claim 9, wherein the zoom lens further satisfies the following conditional expression (1')

$$8.5<100\times D(T,2-3)/fW<10.5. \tag{1'}$$

16. An imaging apparatus comprising:
the zoom lens according to claim 9; and
an imaging device that converts an optical image formed by the zoom lens into an electric signal.

17. A zoom lens comprising:
a first lens group having positive refracting power;
a second lens group having negative refracting power;
a third lens group having positive refracting power;
a fourth lens group having positive refracting power; and
a fifth lens group having positive refracting power arranged in this order from an object side toward an image side,
wherein when the zoom lens undergoes zooming operation from a wide-angle end toward a telescopic end, the first lens group moves away from the second lens group toward an object to be imaged, the third lens group approaches the second lens group toward the object, and the fourth lens group approaches the third lens group toward the object,
the zoom lens satisfies the following conditional expression (1)

$$4.5<100\times D(T,2-3)/fW<15 \tag{1},$$

and
the zoom lens satisfies the following conditional expression (5)

$$4.2<[D(W,2-4)-D(T,2-4)]/fW<5.6 \tag{5}$$

where D(T, 2-3) represents the distance along an optical axis between the surface in the second lens group that is closest to an image to be formed and the surface in the third lens group that is closest to the object to be imaged in the telescopic-end zoom position, and fW represents the focal length of the entire optical system in the wide-angle-end zoom position, and
where D(W, 2-4) represents the distance along the optical axis between the surface in the second lens group that is closest to the object to be imaged and the surface in the fourth lens group that is closest to the image to be formed in the wide-angle-end zoom position, and D(T, 2-4) represents the distance along the optical axis between the surface in the second lens group that is closest to the object and the surface in the fourth lens group that is closest to the image in the telescopic-end zoom position.

18. The zoom lens according to claim 17,
wherein the third lens group is formed of at least two lenses, at least one air separation formed therebetween, a lens disposed closest to the object to be imaged and having a convex object-side surface, and an f-number determination member that determines the f-number of a light flux and is disposed in the air separation present between the vertex of the object-side surface of the lens in the third lens group that is closest to the object to be imaged and the vertex of the image-side surface of the lens in the third lens group that is closest to the image to be formed.

19. The zoom lens according to claim 17,
wherein the zoom lens satisfies the following conditional expression (3)

$$5.0<100\times D(T,3-4)/fW<20 \tag{3}$$

where D(T, 3-4) represents the distance along the optical axis between the surface in the third lens group that is closest to the image to be formed and the surface in the fourth lens group that is closest to the object to be imaged.

20. The zoom lens according to claim 17,
wherein the third lens group is formed of three lenses, a positive lens, a positive lens, and a negative lens arranged in this order from the object side toward the image side.

21. The zoom lens according to claim 17,
wherein the zoom lens satisfies the following conditional expression (4)

$$2.5<f3/fW<4.0 \tag{4}$$

where f3 represents the focal length of the third lens group.

22. The zoom lens according to claim 17,
wherein the second lens group is formed of three lenses, a negative lens, a negative lens, and a positive lens arranged in this order from the object side toward the image side.

23. The zoom lens according to claim 17, wherein the zoom lens further satisfies the following conditional expression (1')

$$8.5<100\times D(T,2-3)/fW<10.5. \tag{1'}$$

24. An imaging apparatus comprising:
the zoom lens according to claim 17; and
an imaging device that converts an optical image formed by the zoom lens into an electric signal.

* * * * *